United States Patent
Majkowski et al.

(10) Patent No.: US 11,411,987 B2
(45) Date of Patent: Aug. 9, 2022

(54) METHODS AND SYSTEMS FOR DETECTION OF SECURITY THREATS ON NETWORK RESOURCES BASED ON REFERRER INFORMATION

(71) Applicant: CLOUDFLARE, INC., San Francisco, CA (US)

(72) Inventors: Marek Przemyslaw Majkowski, Warsaw (PL); Maciej Biłas, Warsaw (PL); David Paul Wragg, London (GB)

(73) Assignee: CLOUDFLARE, INC., San Francisco, CA (US)

(*) Notice: Subject to any disclaimer, the term of this patent is extended or adjusted under 35 U.S.C. 154(b) by 317 days.

(21) Appl. No.: 16/828,297

(22) Filed: Mar. 24, 2020

(65) Prior Publication Data
US 2021/0306371 A1    Sep. 30, 2021

(51) Int. Cl.
*H04L 9/40* (2022.01)

(52) U.S. Cl.
CPC ...... *H04L 63/1458* (2013.01); *H04L 63/0236* (2013.01); *H04L 63/1416* (2013.01); *H04L 63/1425* (2013.01)

(58) Field of Classification Search
CPC ............. H04L 63/1458; H04L 63/0236; H04L 63/1416; H04L 63/1425
See application file for complete search history.

(56) References Cited

U.S. PATENT DOCUMENTS

| | | | |
|---|---|---|---|
| 6,285,999 | B1 | 9/2001 | Page |
| 6,799,176 | B1 | 9/2004 | Page |
| 7,058,628 | B1 | 6/2006 | Page |
| 7,269,587 | B1 | 9/2007 | Page |
| 10,516,687 | B1* | 12/2019 | Ramamurthy ...... H04L 63/1425 |
| 2014/0317741 | A1* | 10/2014 | Be'ery .................... H04L 63/14 726/23 |

OTHER PUBLICATIONS

Rogers, Ian, "Pagerank Explained Correctly with Examples", IPR Computing Ltd., Available Online at <https://www.cs.princeton.edu/~chazelle/courses/BIB/pagerank.htm>, Retrived on Sep. 24, 2019, 17 pages.
Wikipedia, "PageRank", Available Online at <https://web.archive.org/web/20200313192552/https://en.wikipedia.org/wiki/PageRank>, Retrieved on Mar. 13, 2020, 16 pages.

\* cited by examiner

*Primary Examiner* — Huan V Doan
(74) *Attorney, Agent, or Firm* — Nicholson De Vos Webster & Elliott LLP

(57) ABSTRACT

A method and system for detection of security threats on network resources based on referrer indications are presented. A determination that a second request originated from a first network resource is performed based on second request information associated with a second request for a second network resource. In response to determining that the second request originated from the first network resource, a referrer indication that the first network resource is a referrer to the second network resource is logged. A third request for a third network resource is received. A determination that the third request is part of a cyber-attack on a second server is performed based at least in part on the referrer indication.

24 Claims, 10 Drawing Sheets

DETERMINE, BASED AT LEAST IN PART ON THE SECOND REQUEST INFORMATION ASSOCIATED WITH A SECOND REQUEST FOR A SECOND NETWORK RESOURCE, THAT THE SECOND REQUEST ORIGINATED FROM A FIRST NETWORK RESOURCE
242

DETERMINE THAT THE SECOND REQUEST INCLUDES A HEADER INCLUDING THE INDICATION THAT THE SECOND REQUEST ORIGINATED FROM THE FIRST NETWORK RESOURCE
262

THE HEADER IS A HYPERTEXT TRANSFER PROTOCOL (HTTP) REFERER HEADER
264

FIGURE 2G

DETERMINE, BASED AT LEAST IN PART ON THE SECOND REQUEST INFORMATION ASSOCIATED WITH A SECOND REQUEST FOR A SECOND NETWORK RESOURCE, THAT THE SECOND REQUEST ORIGINATED FROM A FIRST NETWORK RESOURCE
242

DETERMINE WHETHER THE FIRST REQUEST AND THE SECOND REQUEST ARE ASSOCIATED WITH THE SAME IP ADDRESS
272

DETERMINE WHETHER THE FIRST REQUEST AND THE SECOND REQUEST ARE RECEIVED WITHIN A THRESHOLD INTERVAL OF TIME BASED ON THE FIRST TIME-INDICATOR AND THE SECOND TIME INDICATOR
274

DETERMINE WHETHER THE FIRST INFORMATION AND THE SECOND INFORMATION ARE SIMILAR
276

DETERMINE WHETHER THE FIRST SESSION IDENTIFIER IS THE SAME AS THE SECOND SESSION IDENTIFIER
278

FIGURE 2H

METHODS AND SYSTEMS FOR DETECTION OF SECURITY THREATS ON NETWORK RESOURCES BASED ON REFERRER INFORMATION

TECHNICAL FIELD

One or more embodiments relate to the field of network computing; and more specifically, to the detection of security threats on network resources based on referrer information.

BACKGROUND ART

Internet hosts are concerned with maintaining high security, performance, and reliability of their hosted resources, such as websites. Servers are electronic devices that are in communications with client devices. The servers receive requests for network resources from client devices. The network resources are served by origin servers or by a proxy server acting on behalf of the origin servers. The requests can be part of cyber-attacks on the servers serving the network resources. Cyber-attacks can result in financial loss, business disruption, damage of reputation, and regulatory actions on organizations that own the network resources. Early detection and quick recovery from a cyber-attack allows the organizations to mitigate risk and business impact of these cyber disruptions.

BRIEF DESCRIPTION OF THE DRAWINGS

The following figures use like reference numbers to refer to like elements. Although the following figures depict various exemplary embodiments, alternative embodiments are within the spirit and scope of the appended claims. In the drawings:

FIG. 2G illustrates a flow diagram of exemplary operations that can be performed for determining that the second request originated from the first network resource, in accordance with some embodiments.

FIG. 2H illustrates a flow diagram of exemplary operations that can be performed for determining that the second request originated from the first network resource, in accordance with some embodiments.

DETAILED DESCRIPTION

Figure 1A:
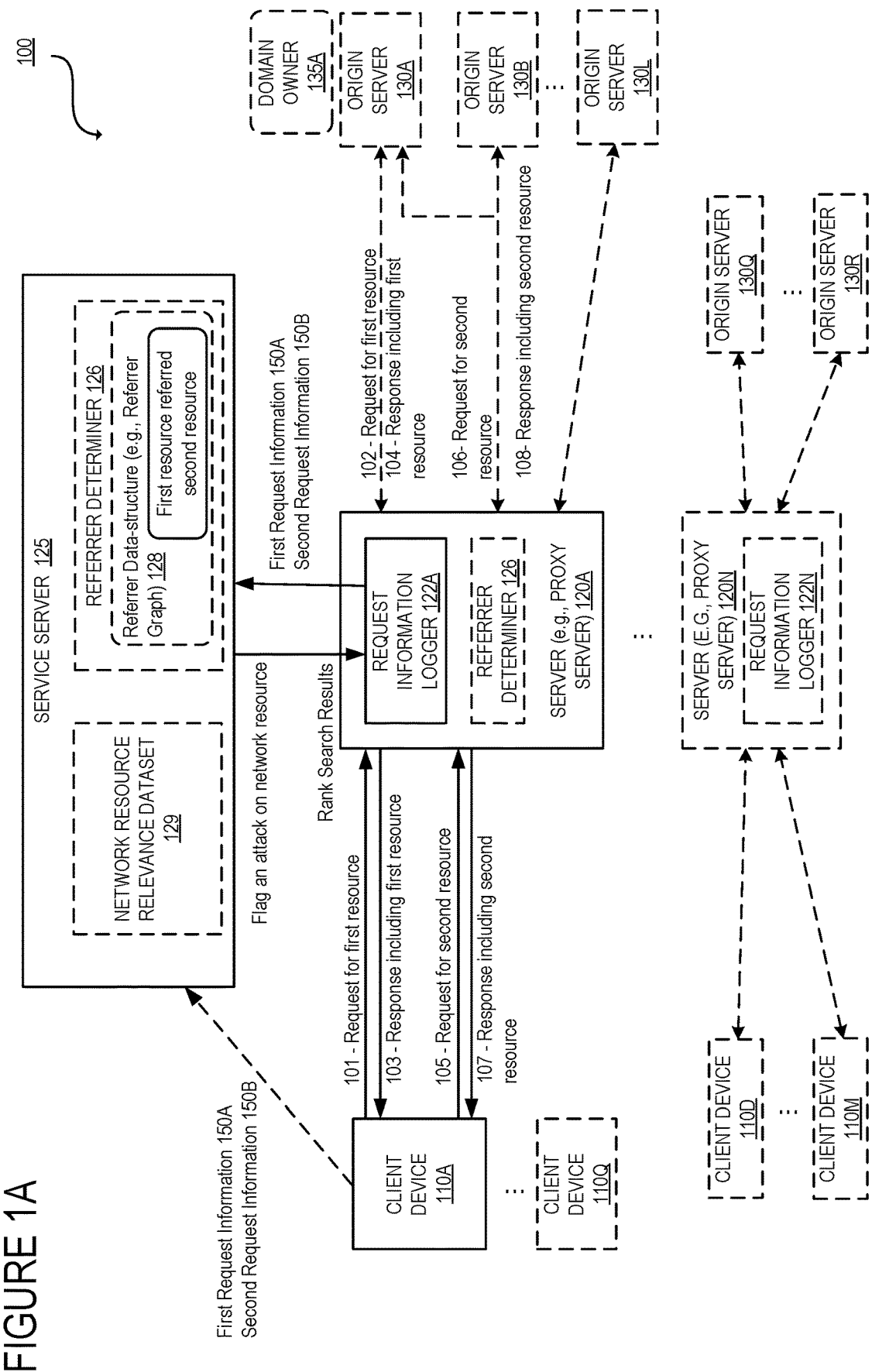
FIG. 1A is a block diagram illustrating a system that can be used for determining referrer indications for network resources, according to some example embodiments.

The following description describes methods and apparatus for detecting security threats based on referrer information. In the below description, numerous specific details such as resource partitioning/sharing/duplication embodiments, types and interrelationships of system components, and logic partitioning/integration choices are set forth in order to provide a more thorough understanding. It will be appreciated, however, by one skilled in the art, that the invention may be practiced without such specific details. In other instances, control structures, logic embodiments, opcodes, means to specify operands, and full software instruction sequences have not been shown in detail since those of ordinary skill in the art, with the included descriptions, will be able to implement what is described without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Bracketed text and blocks with dashed borders (e.g., large dashes, small dashes, dot-dash, and dots) may be used herein to illustrate optional operations and/or structures that add additional features to some embodiments. However, such notation should not be taken to mean that these are the only options or optional operations, and/or that blocks with solid borders are not optional in certain embodiments.

In the following description and claims, the term "coupled," along with its derivatives, may be used. "Coupled" is used to indicate that two or more elements, which may or may not be in direct physical or electrical contact with each other, co-operate or interact with each other.

Methods and systems for detecting security threats against network resources hosted on servers based on resources that refer to one another are presented. A server receives, from a first client device, a first request for a first network resource. The server receives, from a second client device, a second request for a second network resource. The server determines that the second request originated from the first network resource. In response to determining that the second request originated from the first network resource, the server logs for the second request an indication that the first network resource is a referrer to the second network resource. The server receives, from a third client device, a third request for a third network resource. The server determines, based at least in part on the determining that the second request originated from the first network resource, whether the third request is a threat to a second server that hosts the third network resource. In some embodiments, the server may determine whether the third request is part of an attack on a second server that hosts the third network resource. In some embodiments, the attack can be a distributed denial-of-service attack. In other embodiments, the server may determine that the third client device is a malicious bot. In some embodiments, the third request can be a search request, and the server may return a set of search results that are determined based on the referrer indication that the first network resource is a referrer to the second network resource.

Overview

FIG. 1A is a block diagram illustrating a system that can be used for determining referrer indications for network resources, according to some example embodiments. The system 100 includes a server 120A, a set of client devices 110A-M, one or more optional servers, such as server 120N, one or more optional origin servers 130A-L, and optional server 125.

Each one of the client devices 110A-M is a computing device (e.g., laptop, workstation, smartphone, palm top, mobile phone, tablets, gaming system, set-top box, etc.) that is capable of accessing network resources (e.g., they include software, such as client network applications (e.g., web browsers, mobile applications, etc.), which are capable of accessing network resources). Each one of the client devices 110A-M is operative to transmit a request for a network resource that is served by a server. In some embodiments, the network resource is served by an origin server (e.g., origin servers 130A-L). In other embodiments, the network resource is served by a server from the servers 120A-N. Any number of client devices can be in communication with one of the servers 120A-N. For example, a first set of client devices 110A-Q may be in communication with the server 120A, and another set of client devices 110D-M may be in communication with the server 120N. In some embodiments, one or more of the client devices 110A-M are operative to gather request information for requests of network resources that they transmit to a server. The client devices 110A-M are operative to transmit the request information to a server (e.g., server 125). In some embodiments, one or more of the client devices 110A-M are operative to include a request information logger 122A and to perform the operations of the request information logger 122A described below.

Each one of the servers 120A-N is a computing device coupled with one or more client devices through a network (not illustrated). The embodiments herein will be described with respect to the server 120A; however, similar operations can be performed by each one of the multiple servers 120A-N. In some embodiments, the server 120A is operative to gather request information for the request of network resources received at the server. For example, the server 120A is operative to include a request information logger 122A, and to perform the operations of the request information logger 122A described below. This request information can be used to populate a referrer data structure (e.g., a referrer graph). The referrer data structure enables one or more of the servers 120A-N to detect distributed denial-of-service attack, detect malicious bots, and/or assist in a search process. In some embodiments, the server 120A is operative to automatically determine that requests for a network resource are part of a distributed denial-of-service attack against network resources. Additionally, or alternatively, the server 120A is operative to automatically determine that requests for a network resource originate from malicious bots. Additionally, or alternatively, the server 120A is operative to respond to search requests based on the referrer data structure.

In some embodiments, the server 120A can be an origin server that is operative to serve network resources in response to requests received from the client devices 110A-M. In other embodiments, the server 120A is part of a cloud-based service which provides different services for customers (e.g., the domain owner 135A). The server 120A is situated between client devices (e.g., client device 110A, client device 110Q) and the origin server 130A. The owner of the server 120A is typically different from the owner of the origin server 130A. In addition, the server 120A is not typically part of the local network of the origin server 130A. For example, the server 120A is outside of the local area network of the origin server 130A and is typically not physically accessible by the owner/administrator of the origin server 130A. In one embodiment, the server 120A is a reverse proxy server. Certain network traffic is received and processed through the server 120A. For example, web traffic (e.g., Hypertext Transfer Protocol (HTTP) requests/responses, Hypertext Transfer Protocol Secure (HTTPS) requests/responses, Deprecated Open-Specification Networking Protocol (SPDY) requests/responses, etc.) for domains of the origin server 130A may be received and processed at the server 120A. In one embodiment, the domain owner 135A is a customer of the cloud-based service.

By way of example, the cloud-based service may provide services including protecting against Internet-based threats (e.g., proactively stopping botnets, cleaning viruses, trojans, and worms, etc.), providing performance services for customers (e.g., acting as a node in a content delivery network (CDN) and dynamically caching customer's files closer to visitors, page acceleration, content optimization services, etc.), TCP stack optimizations, virtual private network (VPN) services to the client devices, and/or other services. In one embodiment, the cloud-based service provides a mechanism for automatic identification of security threats against the customer's network resources. For example, the cloud-based service provides a mechanism for automatic determination that requests for a network resource are part of a distributed denial-of-service attack against network resources. The cloud-based service may provide a mechanism for automatic determination that requests for a network resource originate from malicious bots. In some embodiments, the cloud-based service provides an improved search mechanism.

Embodiments herein will be described with the server 120A being a proxy server 120A. However, one of ordinary skill in the art would understand that this is intended to be exemplary only and in other embodiments, the server 120A can be an origin server as described above that is operative to perform similar operations. Generally speaking, the server 120A receives certain network traffic from the client devices 110A-M requesting Internet resources. For example, the server 120A may receive requests for an action to be performed on an identified resource (e.g., an HTTP GET request, an HTTP POST request, other HTTP request methods, or other requests to be applied to an identified resource on an origin server) from the client device 110A. In some embodiments, the request received from the client device 110A is destined for an origin server (e.g., origin server 130A). The server 120A analyzes incoming traffic and takes one or more actions on the incoming traffic. In some embodiments, the server 120A causes the incoming traffic to be fulfilled (e.g., by transmitting requests to the appropriate origin server 130A or by retrieving network resources from a cache or from the server 120A in response to incoming requests). In other embodiments, the server 120A may cause the incoming traffic to be blocked and/or monitored when the traffic is determined to be a threat to a requested network resource.

In some embodiments, incoming traffic is received at a particular server 120A as a result of a DNS request for a domain of one of the domain owners 135A resolving to an Internet Protocol (IP) address of the server 120A. By way of example, DNS record(s) for the domain "example.com" may resolve to an IP address of a server 120A. In some embodiments, multiple domains that may be owned by different domain owners may resolve to the same server 120A (e.g., the same IP address or a different IP address of the server 120A). For example, the domain owner 135A owns one or more domains (e.g., example.com) for which the server 120A may receive requests. The server 120A may receive requests for the resources at a given location of the domain (e.g., example.com/login). In some embodiments, incoming traffic is received at a particular server 120A through a VPN connection between the client device transmitting the request and the server 120A. In some embodiments, the traffic received through the VPN connection is further transmitted to an origin server. In other embodiments, the traffic received through the VPN connection is fulfilled at the server 120A.

Each one of the origin servers 130A-L is an electronic device that serves network resources (e.g., web pages, images, word processing documents, PDF files movie files, music files, or other computer files). For example, the origin server 130A may host the domain of the domain owner 135A (e.g., example.com) and is operative to respond to requests for resources at that domain. In some embodiments, the origin server 130A may generate the network resource requested upon receipt of the request for the network resource. Although not illustrated in FIG. 1A, it should be understood that the network resources of the origin servers may be stored separately from the device that responds to the requests.

In some embodiments, the domain owner 135A is a customer of a cloud-based service and registers their respective domain for the service. For example, the authoritative name servers for each domain of the domain owner 135A may be changed to the authoritative name server of the service at operation. It should be understood that the backup authoritative name server serving the domain may also be changed to an authoritative name server of the service. The zone file record for the domain is also changed such that DNS resolution requests for the domain owned by the domain owner 135A, which corresponds with the origin server 130A, resolve to the server 120A. In one embodiment, a customer (e.g., the domain owners 135A or other entity (e.g., web administrators) on behalf of the domain owner 135A) may use the server 125 to change their authoritative name server to the authoritative name server of the service and change their zone file to have their domain point to the server 120A.

The service server 125 is an electronic device operated by the cloud-based service, which provides a set of tools and interfaces for the domain owner 135A and/or to users of the client devices 110A-M. The service server 125 is accessible over the Internet. For example, the service server 125, among other things, allows the domain owner 135A or the user of a client device to register for the service, view statistics/logs of events, and report suspicious events. For example, the service server 125 includes tools to assist the domain owner 135A in changing their authoritative name servers and zone file record. It should be understood, however, that the domain owner 135A may change their authoritative name server and zone file without use of the service server 125 (i.e., they may directly change the authoritative name server and zone file). The service server 125 includes tools to assist a customer of the service to select a set of services offered by the cloud-based service. In some embodiments, the service server 125 includes a referrer determiner 126. In other embodiments, the referrer determiner 126 may be included in the server 120A instead of the service server 125. The referrer determiner 126 is operative to receive request information and determine a referrer data structure. The request information can be received from the servers 120A-N and/or from the client devices 110A-M. In some embodiments, the service server 125 may include the referrer determiner 126 and another server that is part of the cloud-based proxy server and which is separate from the server 125 can be used for allowing domain owners to register for the services. In these embodiments, the registration for the services and the analysis of referrer information may be implemented on separate servers.

In some embodiments the cloud-based service has multiple servers that are geographically distributed (e.g., servers 120A . . . 120N). For example, in some embodiments, the service uses multiple point of presences (POPs). A POP is a collection of networking equipments (e.g., authoritative name servers and servers) that are geographically distributed to decrease the distance between requesting client devices and content. The authoritative name servers have the same anycast IP address and the servers have the same anycast IP address. As a result, when a DNS request is made, the network transmits the DNS request to the closest authoritative name server. That authoritative name server then responds with a server within that POP. Accordingly, a visitor will be bound to that server until the next DNS resolution for the requested domain (according to the TTL (time to live) value as provided by the authoritative name server). In some embodiments, instead of using an anycast mechanism, embodiments use a geographical load balancer to route traffic to the nearest POP. In some embodiments, the server 120A is part of a first PoP located at a first geographical location and the server 120N is located at a second geographical location. Each one of the servers 120A-N may be coupled with one or multiple origin servers (e.g., server 120A may be coupled with origin servers 130A-L and server 120N may be coupled with origin server 130Q-R) and/or with one or multiple client devices (e.g., server 120A may be coupled with client devices 110A-Q and server 120N may be coupled with client devices 110D-M). Moreover, in some embodiments, there are multiple servers providing service for a particular domain. For example, multiple servers may receive requests for a first network resource hosted by the origin server 130A.

The client device 110A makes a first request 101 for a first network resource (e.g., an HTTP GET request, or other request), which is transmitted to the server 120A. The server 120A analyzes the incoming traffic including the request 101 and takes one or more actions, including, for example, logging the request information. In some embodiments, the request information is logged on the server 120A or transmitted to another server, e.g., service server 125. The server 120A determines, through the request information logger 122A, request information for the first request 101.

In some embodiments, the server 120A may transmit the request 102 (e.g., an HTTP GET request) for the network resource to the origin server 130A. The request 102 is generated based on the request 101. The origin server 130A may transmit a response 104 (e.g., an HTTP response) with the requested resource to the server 120A. The server 120A may analyze the incoming traffic including the response 104 and take one or more actions, including, for example, transmitting a response to the requesting client device 110A. In some embodiments, the server 120A may also cache resources for the domains and respond to requests from client devices locally if the requested resource is in cache. For example, when the server 120A receives the first request 101, instead of transmitting the request 102 and receiving the response 104, the server may retrieve the first network resource from a cache (not illustrated). The server 120A then generates the first response 103 including the first network resource. The server 120A transmits the response 103 to the client device 110A. Upon receipt of the response 103, the client device 110A interprets the first network resource (e.g., in a first web application such as a web browser) to be displayed to a user of the client device 110A.

The client device 110A makes a second request 105 for a second network resource (e.g., an HTTP GET request, or other request), which is transmitted to the server 120A. The server 120A analyzes the incoming traffic including the request 105 and takes one or more actions, including, for example, logging second request information associated with the second request 105. In some embodiments, the second request information is logged on the server 120A or transmitted to another server, e.g., service server 125. The server 120A determines, through the request information logger 122A, the second request information for the second request 101.

In some embodiments, the server 120A may transmit the request 106 (e.g., an HTTP GET request) for the network resource to an origin server. In some embodiments, the origin server can be the origin server 130A, while in other embodiments, the origin server can be another origin server (e.g., origin server 130B) that is different from the origin server 130A. The request 106 is generated based on the request 105. The origin server 130A or 130B may transmit a response 108 (e.g., an HTTP response) with the requested resource to the server 120A. The server 120A may analyze the incoming traffic including the response 108 and take one or more actions, including, for example, transmitting a response to the requesting client device 110A. In some embodiments, the server 120A may also cache resources for the domains and respond to requests from client devices locally if the requested resource is in cache. For example, when the server 120A receives the second request 103, instead of transmitting the request 104 and receiving the response 108, the server may retrieve the second network resource from a cache (not illustrated). The server 120A then generates the second response 107 including the second network resource. The server 120A transmits the response 107 to the client device 110A. Upon receipt of the response 107, the client device 110A may interpret the second network resource (e.g., in a first web application such as a web browser) to be displayed to a user of the client device 110A.

The server 120A logs the first and second request information for the first and the second requests respectively. The first and second request information is then used by a referrer determiner 126 to determine whether a resource originated from another one. In some embodiments, the referrer determiner 126 is included in the server 120A such that the determination of whether a resource originates from another one is performed in the server 120A. Alternatively, the referrer determiner 126 can be included in the service server 125 such that the determination of whether the resource originates from another one is performed in the server 120A.

In some embodiments, the server 120A may be in communication with one or more additional client devices (e.g., client device 110Q) and may log request information for each one of the requests received from these client devices. The request information is then used to determine (by the referrer determiner 126) which network resources requested by the client devices refer to one another. Additionally, the system 100 may include one or more additional servers, e.g., server 120N, that are part of a cloud-based service. These servers are operative to log request information for the requests that they receive from the client devices 110A-M. In some embodiments, multiple servers of the server 120A-N are operative to transmit the request information to the service server 125. While in some embodiments, the request information is received from the servers 120A-N, in other embodiments, the request information is received from one or more of the client devices 110A-M. The service server 125 is then operative to analyze the received request information to determine a referrer data-structure 128. The referrer data structure 128 includes the referrer indication that the second network resource originated from the first network resource as determined based on the first request information associated with the first request and the second request information associated with the second request.

Figure 1B:
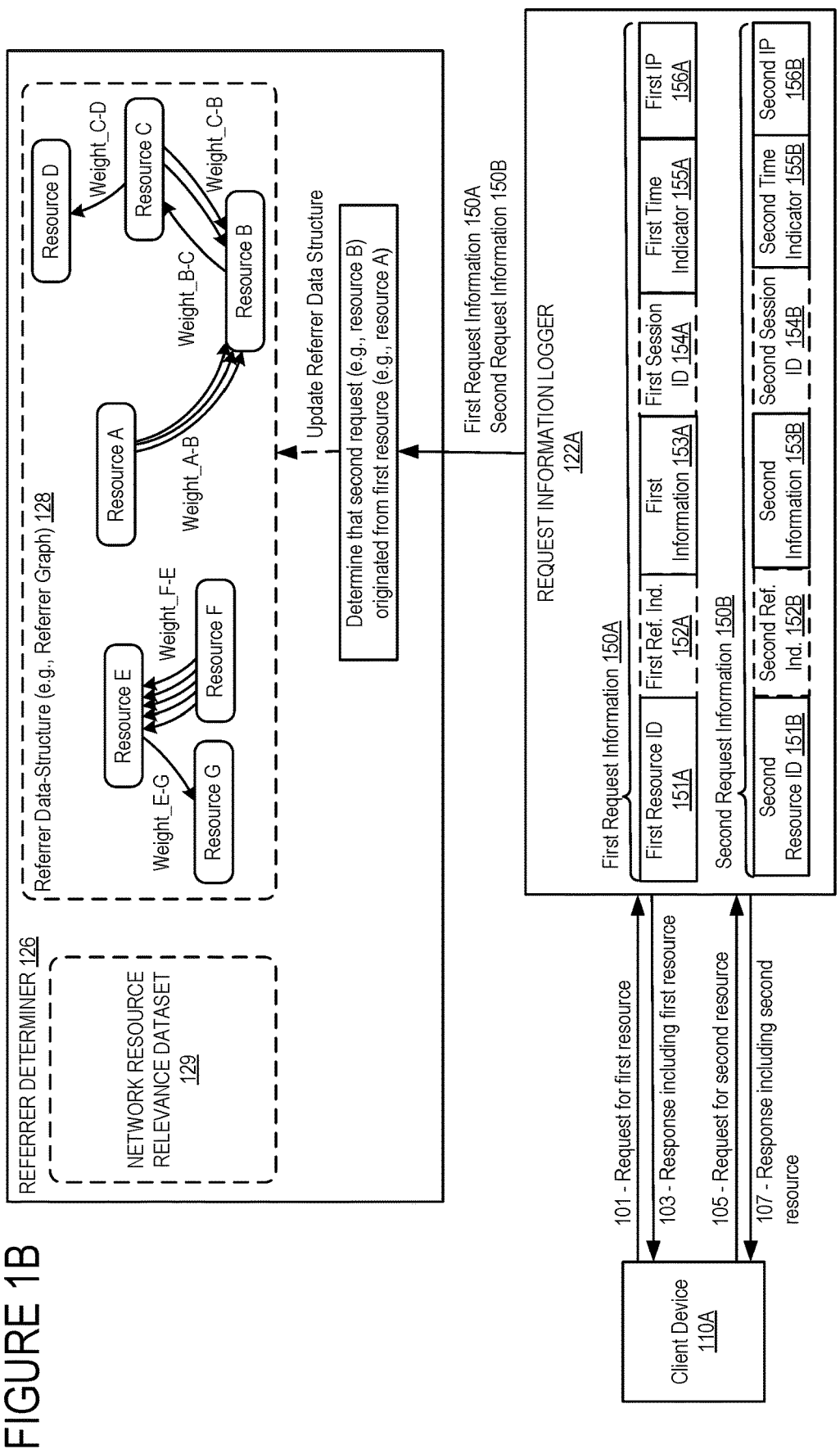
FIG. 1B is a more detailed block diagram illustrating a request information logger that can be used for determining request information, according to some example embodiments.

FIG. 1B is a more detailed block diagram illustrating a request information logger that can be used for determining request information, according to some example embodiments. In some embodiments, the request information logger 122A is included in a server, such as server 120A. In other embodiments, the request information logger 122A is included in a client device, e.g., client device 110A. In these embodiments, the request information logger 122A can be part of the web client application that transmits requests to the server. The request information logger 122A determines the first request information from the first request. Determining the first request information 150A may include determining an identification of the first network resource (first resource ID 151A), determining first information 153A, determining first user session identifier 154A, and determining a first time-indicator 155A. The identification of the first network resource 151A upon which the request is to be applied is a location of the requested first network resource (e.g., URI (e.g., example.com)). The first information 153A identifies a first client network application that transmitted the first request 101 from the first client device 110A. The first information can be determined from one or more headers included in the request 101. For example, the first information can be a value of a user-agent header, which is also referred to as a user-agent string. The user-agent header includes a characteristic identification string that identifies one or more of the type of the client network application type, the operating system, the software vendor, or the software revision, by submitting a to its operating peer. In HTTP this identification is transmitted in a header field User-Agent. Bots, such as web crawlers, often also include a URL and/or e-mail address so that the domain owner of the requested network resource can contact the operator of the bot.

In some embodiments, determining the first request information may further include determining a referrer indication 152A. In other embodiments, determining the first request information does include determining the referrer indication 152A. The referrer indication 152A includes an identification of a network resource from which the first request originated. The referrer indication 152A indicates that another network resource is a referrer to the first network resource. The referrer indication 152A allows the client network application of the first client device 110A to specify in the first request 101 the location (e.g., URI) of the network resource from which the requested first network resource originated. In some embodiments, the first header 152A can be an HTTP referer header. In other embodiments, the referrer indication 152A is not included in the first request 101. For example, when the first request 101 is obtained as a result of a user inputting the address of the requested first network resource on a keyboard. The first user session identifier 154A identifies the first request as part of a same user session as a set for one or more other requests received at the server 120A. In some embodiments, the first user session identifier 154A can be a web cookie that is placed on the client device 110A to identify individual clients behind a shared IP address. In some embodiments, the web cookie can be generated by the server 120A upon receipt of an initial request from the client device 110A. In an alternative embodiment, the web cookie can be generated by the origin server 130A upon receipt of an initial request from the client device 110A (in some embodiments, this request can be first received by the proxy server 120A and transmitted to the origin server 130A). The web cookie is transmitted (from the origin server 130A and/or from the proxy server 120A) to the client device 110A and is used in subsequent requests received from the client device 110A to identify these requests as part of a same session from the client device 110A. The web cookie may expire after a predetermined period of time (e.g., 2 h, 24 h, 4 days, 30 days, or any other time interval). In some embodiments, the first user session identifier may not be present in the first request 101 and may not be determined by the request information determiner 122A. The first time-indicator 155A includes a time at which the first request 101 is received at the server 120A. For example, the first time-indicator 155A is a timestamp generated by the server 120A upon receipt of the first request 101. The determination of the request information 150A may also include the determination of the first IP address associated with the first request (e.g., the IP address of the client device 110A). The first IP address is determined as the source IP address of IP packet(s) that include the first request 101.

The request information logger 122A determines the second request information 150B from the second request 102. Determining the second request information 150B may include determining an identification of the second network resource (second resource ID 151B), second information 153B, second user session identifier 154B, and a second time-indicator 155B. The identification of the second network resource 151A identifies the requested resource. For example, the identification of the second network resource can be a location of the second network resource (e.g., URI (e.g., example.com/login)). The second information 153B identifies a client network application that transmitted the second request from the first client device 110A. The second information 153B can be determined from one or more headers included in the request 105. For example, the second information 153B can be a value of an HTTP user-agent header, which is also referred to as a user-agent string. The second time-indicator includes a time at which the second request 105 is received at the server 120A. For example, the second time-indicator can be a timestamp generated by the proxy 120A upon receipt of the second request 105. The determination of the request information 150B may also include the determination of the second IP address associated with the second request (e.g., the IP address of the client device 110A). The second IP address is determined as the source IP address of IP packet(s) that include the second request 105.

In some embodiments, determining the second request information may further include determining a second referrer indication 152B. The second referrer indication 152B indicates that the second request originated from the first network resource. In some embodiments, the second referrer indication is included in a second header of the request 105. The second header allows the client network application of the first client device 110A to specify in the second request 105 the location (e.g., URI) of the network resource from which the requested second network resource originated. In some embodiments, the second header can be an HTTP referer header. In other embodiments, the second header is not included in the second request 105 and the request information logger 122A does not determine the second referrer indication 152B. For example, when the second request 105 is obtained as a result of a user typing the address of the requested second network resource on a keyboard. In another example, the network resource owner may set the referrer indication to not be sent for that network resource and the client network application may not transmit the referrer indication. In another example, when the web client network application is not a web browser (e.g., when the client network application is an email client, or an application on a mobile phone, etc.) the request 101 may not include the referrer indication. In another example, when the client device is a malicious bot, the referrer indication may have been omitted intentionally and the referrer indication may not be present in the request 101.

In some embodiments, determining the second request information further includes determining a second user session identifier 154B. The second user session identifier 154B identifies the second request 105 as part of a same user session as a set for one or more other requests received at the server 120A. For example, the second user session identifier 154B may be the same as the first user session identifier 154A when the first request 101 and the second request 105 are part of the same user session. The determination that the first request and the second request are part of the same user session indicates that the first request and the second request originated from the same client device within a predetermined interval of time. In some embodiments, the second user session identifier can be a web cookie that is placed on the client device 110A to identify individual clients behind a shared IP address. In some embodiments, the second user session identifier may not be present in the second request 105 and may not be determined by the request information determiner 122A.

Upon determination of the first and second request information 150A-B, this information is transmitted to the referrer determiner 126. Upon receipt of the request information, the referrer determiner 126 determines that the second request originated from the first network resource based on the first request information and the second request information. In some embodiments, the determination that the second request 105 originated from the first network resource 101 includes determining that the request information 150B includes the referrer indication 152B that identifies the first network resource as a referrer for the second network resource. For example, the request information 150B may include the referrer indication 152B as a value of a header from the second request. The header can be an HTTP referer header.

In another embodiment, the determination that the second request 105 originated from the first network resource 101 is performed based on one or more of the first IP address 156A and the second IP address 156B, the first information 153A and the second information 153B, the first user session identifier 154A and the second user session identifier 154B, and/or the first time-indicator 155A and the second time-indicator 155B. When the second request does not include a header including the referrer indication for linking the first network resource and the second network resource, the referrer determiner 126 determines, based on one or more of the parameters included in the first request information 150A and the second request information 150B, that the second network resource originated from the first network resource. For example, the referrer determiner 126 may determine whether the first request 101 and the second request are associated with the same IP address (i.e., whether the first IP address 156A and the second IP address 156B are the same). Further, the referrer determiner 126 determines that the first request 101 and the second request are received within a threshold interval of time based on the first time-indicator 155A and the second time-indicator 155B, which may be an indication that the user of the client device 110A has visited the second network resource following the first network resource. In some embodiments, upon determining that the first request and the second request are associated with the same IP address and that these requests are received within the threshold time interval, the referrer determiner 126 may determine that the first network resource is a referrer to the second network resource (in other words that the second network resource is visited following a visit to the first network resource).

In other embodiments, the determination that the first request and the second request are associated with the same IP address and that these requests are received within the threshold time interval is not sufficient to determine that the second network resource has originated from the first network resource. For example, several client devices may share the same IP address and may transmit requests to the server 120A within the threshold time interval. Thus, the referrer determiner 126 may determine that the second network resource has originated from the first network resource based on a combination of other criteria. For example, in addition to determining that the first request and the second request are associated with the same IP address, that the time-indicators are within the threshold time interval, the referrer determiner 126 may further determine whether the first information 152A and the second information 153B are similar, indicating that the first request 101 and the second request 105 were received from the same web client application. Additionally, or alternatively, the referrer determiner 126 may determine whether the first session identifier 154A is the same as the second session identifier 154B. In some embodiments, the determination that the first network resource is a referrer to the second network resource can further be performed based on past requests received from the client device 110A and/or other requests received from other client devices for the first and the second network resources.

Upon determination that the first network resource (e.g., Resource A in FIG. 1B) is a referrer to the second network resource (e.g., Resource B in FIG. 1B), this information is logged. For example, the information can be logged as the referrer data structure (e.g., a referrer graph) 128 linking the first network resource (resource A) as an origin from which the second network resource (Resource B) was requested. The referrer data structure 128 includes a set of network resources: resource A, resource B, resource C, resource D, resource E, resource G, and resource F. Each network resource is associated with at least one other one of the network resources as a result of a determination that the network resource originated from this network resource. In the illustrated referrer data structure 128 of FIG. 1B, an arrow is representative of a request for a network resource that resulted in the identification of the referrer network resource for that network resource. For example, an arrow from resource A to resource B results from the identification of resource A as a referrer to resource based, at least in part, on a request for resource B. This identification can be performed based on the request for resource B only (e.g., when the request for resource B includes the referrer indication). Alternatively, the identification can be performed based on the request for resource and the request for resource A (e.g., when the request for resource B does not include the referrer indication). The number of arrows between two resources indicates the number of requests received for a resource. For example, resource A and resource B have three arrows indicating that three requests for resource B were transmitted/received resulting in resource A being identified as a referrer to resource B three times; resource C and resource B have two arrows indicating that two requests for resource B were transmitted/received resulting in resource C being identified as a referrer to resource B three times; resource B and resource C have one arrow indicating that a single request for resource C was transmitted/received resulting in resource B being identified as a referrer to resource C once; resource C and resource D have one arrow indicating that a single request for resource D was transmitted/received resulting in resource C being identified as a referrer to resource D once; resource E and resource G have one arrow indicating that a single request for resource G was transmitted/received resulting in resource E being identified as a referrer to resource G once; resource F and resource E have five arrows indicating that five requests for resource E were transmitted/received resulting in resource F being identified as a referrer to resource F five times. While the arrows correspond to the number of requests transmitted/received for a network resource this is intended to be for illustrative purposes only and one would understand that other mechanisms are used to keep track of a number of times a network resource is identified to be a referrer to another network resource (e.g., counter, etc.). While FIG. 1B includes a graph as an exemplary data structure used for logging referrer indication for the network resources, in other embodiments different types of data structures can be used (e.g., tables, lists, etc.).

In some embodiments, the referrer indication can also be associated with a cost or weight. For example, the referrer indication indicates that resource A is a referrer to resource B is associated with weight_A-B; the referrer indication that resource C is a referrer to resource B is associated with weight_C-B; the referrer indication that resource B is a referrer to resource C is associated with weight_B-C; the referrer indication that resource C is a referrer to resource D is associated with weight_C-D; the referrer indication that resource E is a referrer to resource G is associated with weight_E-G; the referrer indication that resource F is a referrer to resource E is associated with weight_F-E. The weight (e.g., weight_A-B) associated with each referrer indication represents the confidence the system has in the determination that the first network resource (e.g., resource A) is a referrer to the second network resource. The weight can be an estimate of a probability that the first network resource is a referrer for the second network resource. In a non-limiting example, the weight can be a numerical value in an interval between [0, 1]. For example, when the second request 105 includes the header including the referrer indication, the weight is associated with the highest confidence level (e.g., 1). Alternatively, when the second request 105 does not include the referrer indication (e.g., it does not include a header with the referrer indication) and the referrer determiner 126 determines that the first network resource is a referrer to the second network resource, the weight is associated with a confidence level that is strictly lower than the highest confidence level (e.g., a value greater than 0 but strictly smaller than 1).

The weight associated with a referrer indication can be determined based on multiple factors and may depend on the number of requests received for the first network resource and the second network resource. In some embodiments, the determination of the weight to be associated with a referrer indication that the first network resource is a referrer to the second network resource can further be performed based on past requests received from the client device 110A and/or other requests received from other client devices for the first and the second network resource. The weight is proportional to the number of requests that result in a first network resource being identified as a referrer to the second network resource. The greater the number of requests resulting in the first network resource being identified as a referrer to the second network resource, the greater the weight is. In these embodiments, weight_A-B would be greater than weight_B-C or weight_C-B, and weight_F-E would be greater than weight_A-B. Further, the weight associated with a referrer indication (e.g., indication that resource A is referrer to resource B) vary as new requests for a network resource are received. For example, if it was previously determined that the first network resource, e.g., resource A, is a referrer to the second network resource, e.g., resource B, weight_A-B is increased when a new determination that the resource A is a referrer to resource B occurs upon receipt/transmission of a new request for resource B. In some embodiments, additional criteria and/or parameters can be used when determining the weight associated with a referrer indication. In some embodiments, a combination of volume of requests to the second network resource with the first network resource as the referrer with other trust metrics (e.g., metrics indicating a level of trust the system has in that the request originated from an honest device, i.e. the request is not part of any attack, bot activity) can be used to determine the weight. For example, if a request is determined to be malicious (by the server 120A or the server 125), the referrer indication resulting from the request can be used to update an existing weight for that referrer indication accordingly. The detection of the request as being a malicious request may result in the decrease of the weight associated with the referrer indication. In some embodiments, the weight associated with the referrer indication can be updated when a given number of requests resulting in that referrer indication is determined to be malicious exceeds a given threshold. In other words, in some embodiments, the weight is decreased only if a number of malicious requests that exceed the threshold is received. If the number of malicious requests does not exceed the threshold, the weight is not decreased. For example, the weight may remain unchanged when the number of malicious requests is below the threshold.

In some embodiments, during a single user session, a user of a client device 110A may visit multiple network resources resulting in multiple requests being transmitted to the server 120A. In some embodiments, when the server 120A is a proxy server that receives requests from the client device 110A instead of the origin server(s) that host these resources, the server 120A may receive a subset of all requests that originates from the client device 110A during a same user session. For example, in a first series of requests the user may navigate through a website that is hosted on an origin server of which the owner is a customer of the cloud-based service resulting in all requests for these resources to be received at a proxy server of the cloud-based service. However, at a given time the user may click on an external link for requesting a resource that is not hosted by an origin server of which the owner is a customer of the cloud-based service. In this case, the request for this resource will not be received by a server of the cloud-based service and instead will be received by another server that is not in the network of the cloud-based service. This may cause the referrer information logged for the user session to be incomplete. In some embodiments, the multiple views on the user session can be constructed and rated in terms of likelihood of being correct, by the referrer determiner 126. For example, the referrer determiner 126 may refer to information collected in previous user sessions to determine whether to set a first network resource as a referrer to another network resource and/or how to calculate the weight associated with this determination.

In some embodiments, the referrer determiner 126 receives request information from one or multiple servers (e.g., 120A-N) and/or one or more client devices (e.g., client device 110A-M). In these embodiments, the referrer data-structure 128 is generated based on the request information received from these multiple electronic devices related to multiple network resources. In some embodiments, the referrer data-structure 128 is used to detect security threats on the network resources. In other embodiments, the referrer data-structure 128 is used to determine a ranking of network resources output in response to a search request.

The operations in the flow diagrams are described with reference to the exemplary embodiments in the other figures. However, the operations of the flow diagrams can be performed by embodiments other than those discussed with reference to the other figures, and the embodiments discussed with reference to these other figures can perform operations different than those discussed with reference to the flow diagrams.

Determining Request Information

Figure 2A:
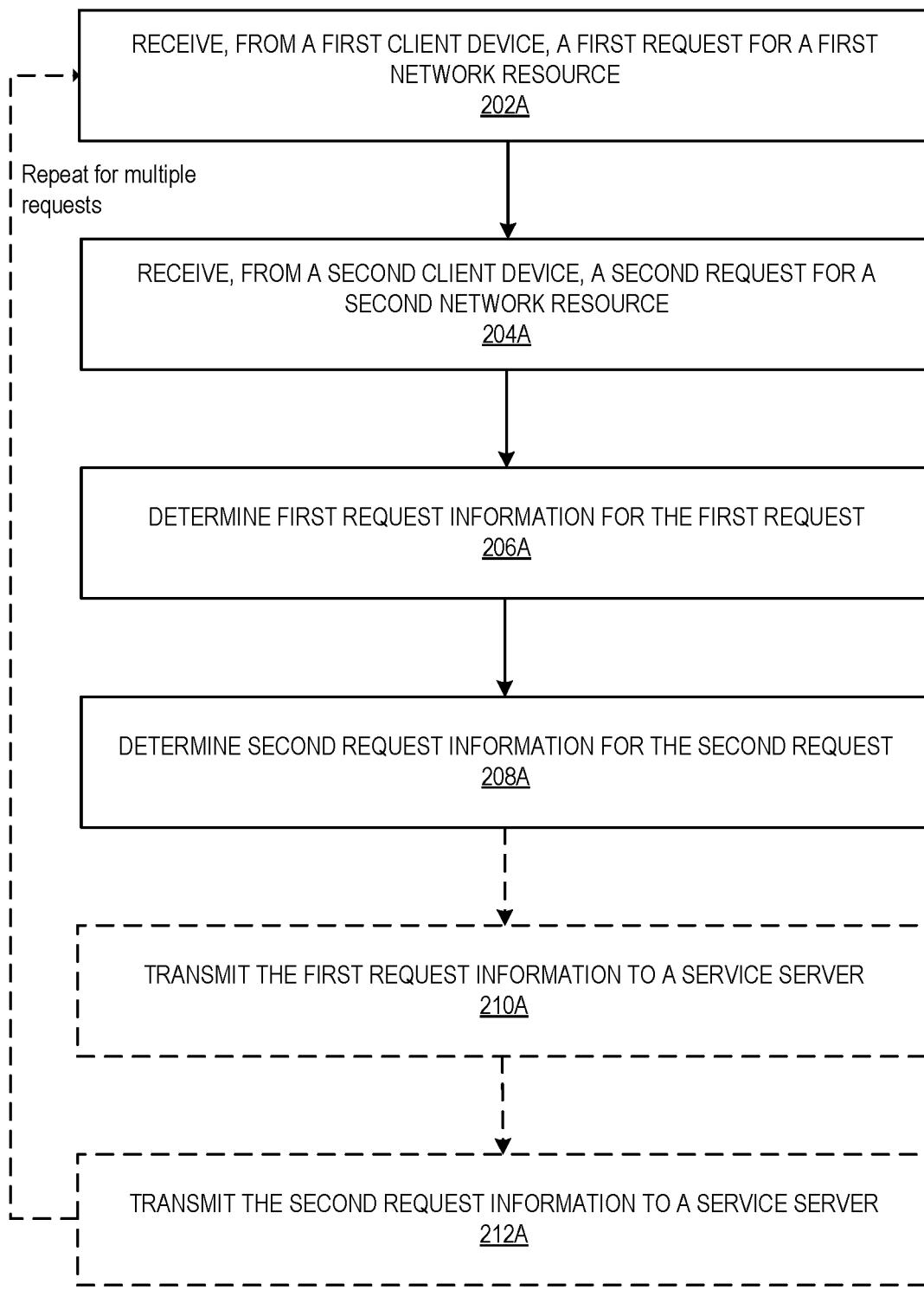
FIG. 2A is a flow diagram illustrating exemplary operations that can be performed for determining request information for a request, according to some embodiments.

FIG. 2A is a flow diagram illustrating exemplary operations that can be performed for determining request information for a request, according to some embodiments. The operations of FIG. 2A are performed when a request information logger 122A is included in a server, such as server 120A. At operation 202A, the server 120A receives, from a first client device 110A, a first request 101 for a first network resource (e.g., Resource A). At operation 204A, the server 120A receives, from a second client device, a second request for a second network resource (e.g., Resource B). The first client device and the second client device can be the same client device or different client devices. At operation 206A, the server 120A determines first request information for the first request 101. At operation 208A, the server 120A determines second request information for the second request 105. The flow of operations moves to optional operation 210A, at which the server transmits the first request information to the service server 125. The flow of operations may move to operation 212A, at which the server 120A transmits the second request information to the service server 125. In some embodiments, the operations 210A and/or 21A2 can be skipped. In these embodiments, the first request information and the second request information (e.g., 150A and 150B) are analyzed in the server 120A instead of being transmitted to the service server 125. The operations of receiving requests and determining request information are repeated for multiple requests received at the server.

Figure 2B:
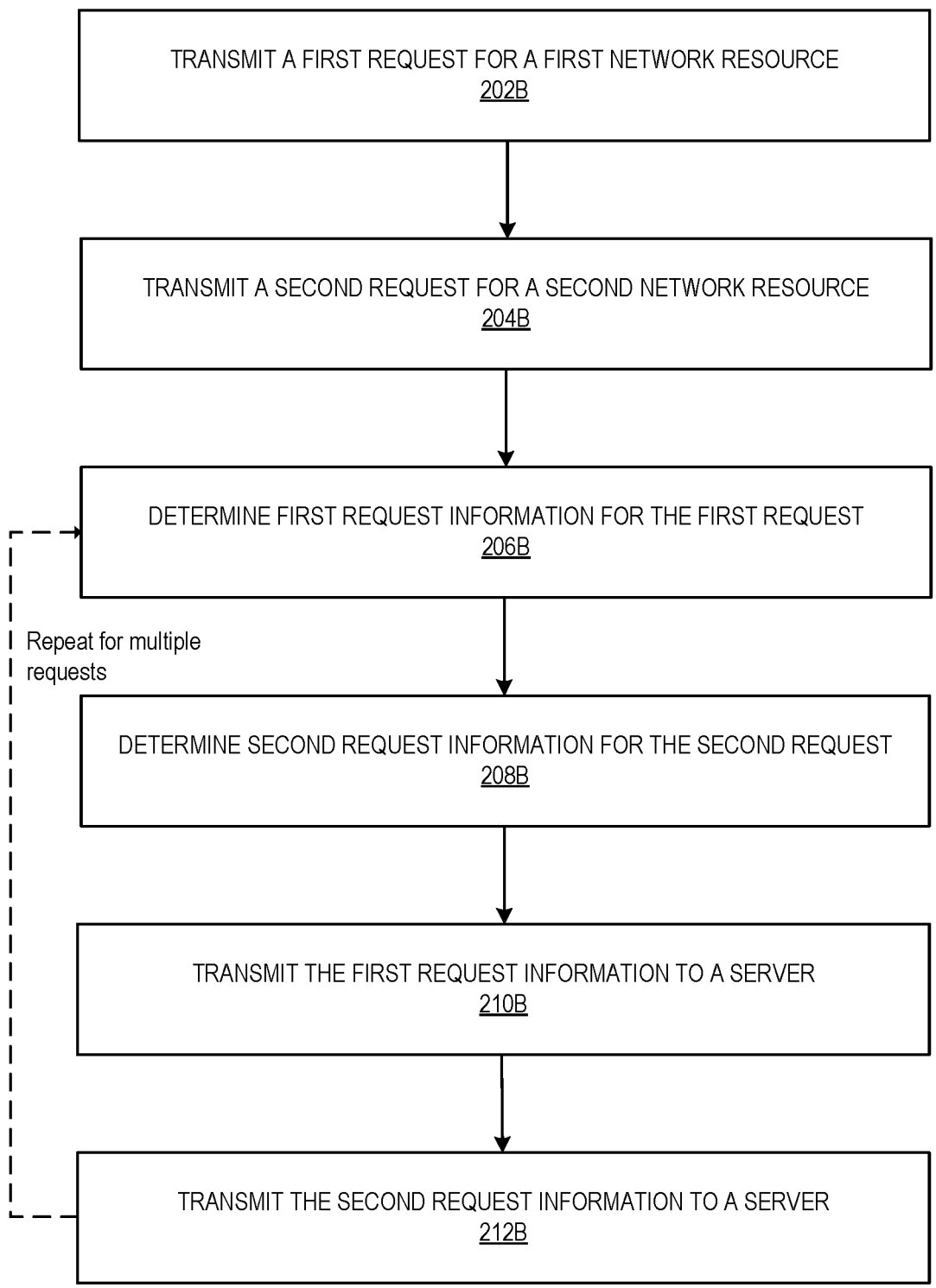
FIG. 2B is a flow diagram illustrating exemplary operations that can be performed for determining request information for a request, according to some embodiments.

FIG. 2B is a flow diagram illustrating exemplary operations that can be performed for determining request information for a request, according to some embodiments. The operations of FIG. 2B are performed when a request information logger 122A is included in a client device, such as client device 110A. At operation 202B, client device 110A transmits a first request 101 for a first network resource (e.g., Resource A). At operation 204B, the client device 110A transmits a second request for a second network resource (e.g., Resource B). At operation 206B, the client device 110A determines first request information for the first request 101. At operation 208B, the client device 110B determines second request information for the second request 105. The flow of operations moves to operation 210B, at which the client device 110A transmits the first request information to a service. The flow of operations moves to operation 212B, at which the server 120A transmits the second request information to the service server 125. In some embodiments, the server is the service server 125. In other embodiments, the server is the server 120A. The operations of determining request information and transmitting the request information to a server are repeated for multiple requests transmitted by the client device 110A to a server.

Figure 2D:
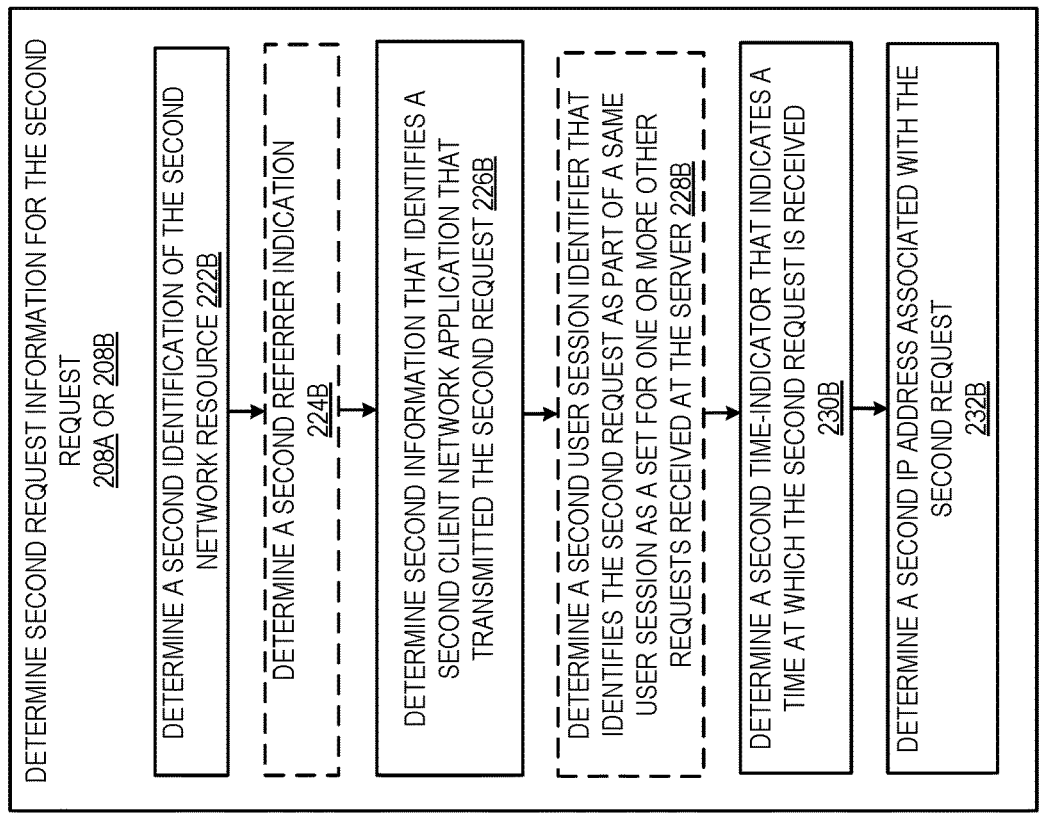
FIG. 2D is a flow diagram illustrating exemplary operations that can be performed for determining the second request information for the second request, according to some example embodiments.
Figure 2C:
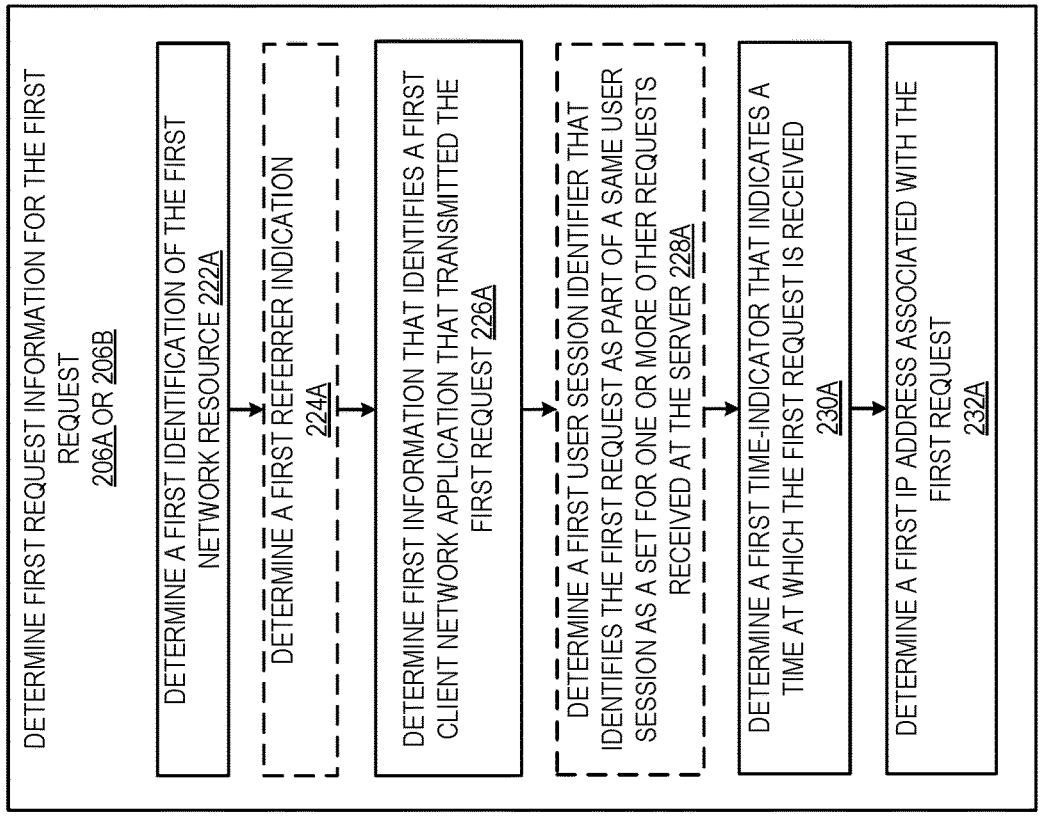
FIG. 2C is a flow diagram illustrating exemplary operations that can be performed for determining the first request information for the first request, according to some example embodiments.

FIG. 2C is a flow diagram illustrating exemplary operations that can be performed for determining the first request information for the first request, according to some example embodiments. In some embodiments, determining the first request information for the first request at operations 206A or 206B includes one or more of the operations 222A-232A of FIG. 2C. At operation 222A, the request information logger 122A determines an identification of the first network resource. The identification of the first network resource 151A is a location of the requested first network resource (e.g., URI (e.g., example.com)).

The flow of operations moves to operation 224A, at which a first referrer indication is determined. The first referrer indication indicates that another network resource is a referrer to the first network resource. In some embodiments, the first referrer indication is included in a header (e.g., first header 152A). The header is populated by the client network application of the first client device 110A to specify in the first request 101 the location (e.g., a Uniform Resource Identifier (URI) or an Internationalized Resource Identifier (IRI)) of the network resource from which the requested first network resource originated. In some embodiments, the first header 152A can be an HTTP referer header. In some embodiments, the determination of the first request information does not include the determination of the referrer indication and the operation 224A is skipped. For example, when the first request 101 is transmitted by the client device 110A and received at the server 120A as a result of a user typing the address of the requested first network resource on a keyboard, the first request 101 does not include a header including the referrer indication. In another example, the network resource owner may set the referrer indication to not be sent for that network resource and the client network application may not transmit the referrer indication. In another example, when the client network application is not a web browser (e.g., when the client network application is an email client, or an application on a mobile phone, etc.) the request 101 may not include the referrer indication. In another example, when the client device is a malicious bot, the referrer indication may have been omitted intentionally and the referrer indication may not be present in the request 101.

The flow moves to operation 226A, at which the request information logger 122A determines the first information. The first information 153A identifies a first client network application that transmitted the first request 101. The first information can be determined from one or more headers included in the request 101. For example, the first information can be a value of an HTTP user-agent header, which is also referred to as a user-agent string.

The flow of operation then moves to operation 228A, at which the request information logger 122A determines the first user session identifier. The first user session identifier (e.g., first user session identifier 154A) identifies the first request as part of a same user session as a set for one or more other requests transmitted by the client device 110A and received at the server 120A. In some embodiments, the first user session identifier 154A can be a web cookie that is placed on the client device 110A to identify individual clients behind a shared IP address. In some embodiments, the web cookie can be generated by the server 120A upon receipt of an initial request from the client device 110A. The web cookie is transmitted to the client device 110A and is used in subsequent requests received from the client device 110A to identify these requests as part of a same session from the client device 110A. The web cookie may expire after a predetermined period of time (e.g., 2 h, 24 h, 4 days, 30 days, or any other time interval predefined at the server 120A). In some embodiments, the first user session identifier may not be present in the first request 101 and the operation 228A is skipped.

The flow of operations moves to operation 230A, at which the request information logger 122A determines the first time-indicator 155A. In one embodiment, the first time-indicator 155A includes a time at which the first request 101 is transmitted by the client device 110A. For example, the first time-indicator 155A is a timestamp generated by the client device 110A upon transmission of the first request 101. In another embodiment, the first time-indicator 155A includes a time at which the first request 101 is received at the server 120A. For example, the first time-indicator 155A is a timestamp generated by the server 120A upon receipt of the first request 101. The flow of operations moves to operation 232A, at which the request information logger 122A determines the first IP address associated with the first request (e.g., the IP address of the client device 110A). The first IP address is determined as the source IP address of IP packet(s) that include the first request 101.

FIG. 2D is a flow diagram illustrating exemplary operations that can be performed for determining the second request information for the second request, according to some example embodiments. In some embodiments, determining the second request information for the second request at operation 208A or operation 208B includes one or more of the operations 222B-232B of FIG. 2D. At operation 222B, the request information logger 122A determines an identification of the second network resource. The identification of the second network resource 151B is a location of the requested second network resource (e.g., URI (e.g., example.com/login)).

The flow of operations moves to operation 224B, at which a second referrer indication is determined. The second referrer indication indicates that the second network resource originated from the first network resource (or in other words that the first network resource is a referrer to the second network resource). In some embodiments, the second referrer indication is included in a header (e.g., second header 152B) of the second request 105. The second referrer indication identifies the location of the first network resource (e.g. URI or IRI) which is linked to the second network resource that is being requested. The second referrer indication is the location of the previous network resource (here the first network resource) from which a link to the currently requested network resource (here the second network resource) was followed. The request information logger 122A checks the value of the second header in the second request to identify the first network resource. The second header is populated by the client network application of the first client device 110A to specify in the second request 105 the location of the first network resource from which the requested second network resource originated. In some embodiments, the second header 152B can be an HTTP referrer header.

In some embodiments, the determination of the second request information does not include the determination of the referrer indication and the operation 224B is skipped. For example, when the second request 105 is transmitted by a client device 110A and received at the server 120A as a result of a user typing the address of the requested second network resource on a keyboard the second request 105 does not include a header including the referrer indication. In another example, the network resource owner may set the referrer indication to not be sent for that network resource and the client network application may not transmit the referrer indication. In another example, when the client network application is not a web browser (e.g., when the client network application is an email client, or an application on a mobile phone, etc.) the request 105 may not include the referrer indication. In another example, when the client device is a malicious bot, the referrer indication may be intentionally omitted by the client device and may not be present in the request 105. Thus, in some embodiments, while the second request 105 may have originated from the first network resource, the second request does not include a header with a referrer indication.

The flow moves to operation 226B, at which the request information logger 122A determines the second information. The second information 153B identifies a second client network application that transmits the request 105. The second information can be determined from one or more headers included in the request 105. For example, the second information can be a value of an HTTP user-agent header, which is also referred to as a user-agent string.

The flow of operation then moves to operation 228B, at which the request information logger 122A determines the second user session identifier. The second user session identifier 154B identifies the second request as part of a same user session as a set for one or more other requests transmitted by the client device 110A and received at the server 120A. In some embodiments, the second user session identifier 154A can be a web cookie that is placed on the client device 110A to identify individual clients behind a shared IP address. In some embodiments, the web cookie can be generated by the proxy server 120A upon receipt of an initial request from the client device 110A. The web cookie is transmitted to the client device 110A and is used in subsequent requests received from the client device 110A to identify these requests as part of a same session from the client device 110A. The web cookie may expire after a predetermined period of time (e.g., 2 h, 24 h, 4 days, 30 days, or any other time interval predefined by the server 120A). In some embodiments, the second user session identifier may not be present in the second request 101, and the operation 228B is skipped.

The flow of operations moves to operation 230B, at which the request information logger 122A determines the second time-indicator. In one embodiment, the second time-indicator 155B includes a time at which the second request 105 is transmitted by the client device 110A. For example, the first time-indicator 155A is a timestamp generated by the client device 110A upon transmission of the first request 101. In another embodiment, the first time-indicator 155A includes a time at which the first request 101 is received at the server 120A. For example, the second time-indicator 155B is a timestamp generated by the server 120A upon receipt of the second request 105. In some embodiments, the second time-indicator 155B when compared to the first time-indicator indicates that the second request 105 is transmitted by the client device 110A after the first request 101. In some embodiments, the second time-indicator 155B when compared to the first time-indicator indicates that the second request 105 is received at the server 120A after the first request 101. The flow of operations moves to operation 232B, at which the request information logger 122A determines the second IP address associated with the second request (e.g., the IP address of the client device 110A). The second IP address is determined as the source IP address of IP packet(s) that include the second request 105.

Detecting a Security Threat on a Network Resource

Figure 2E:
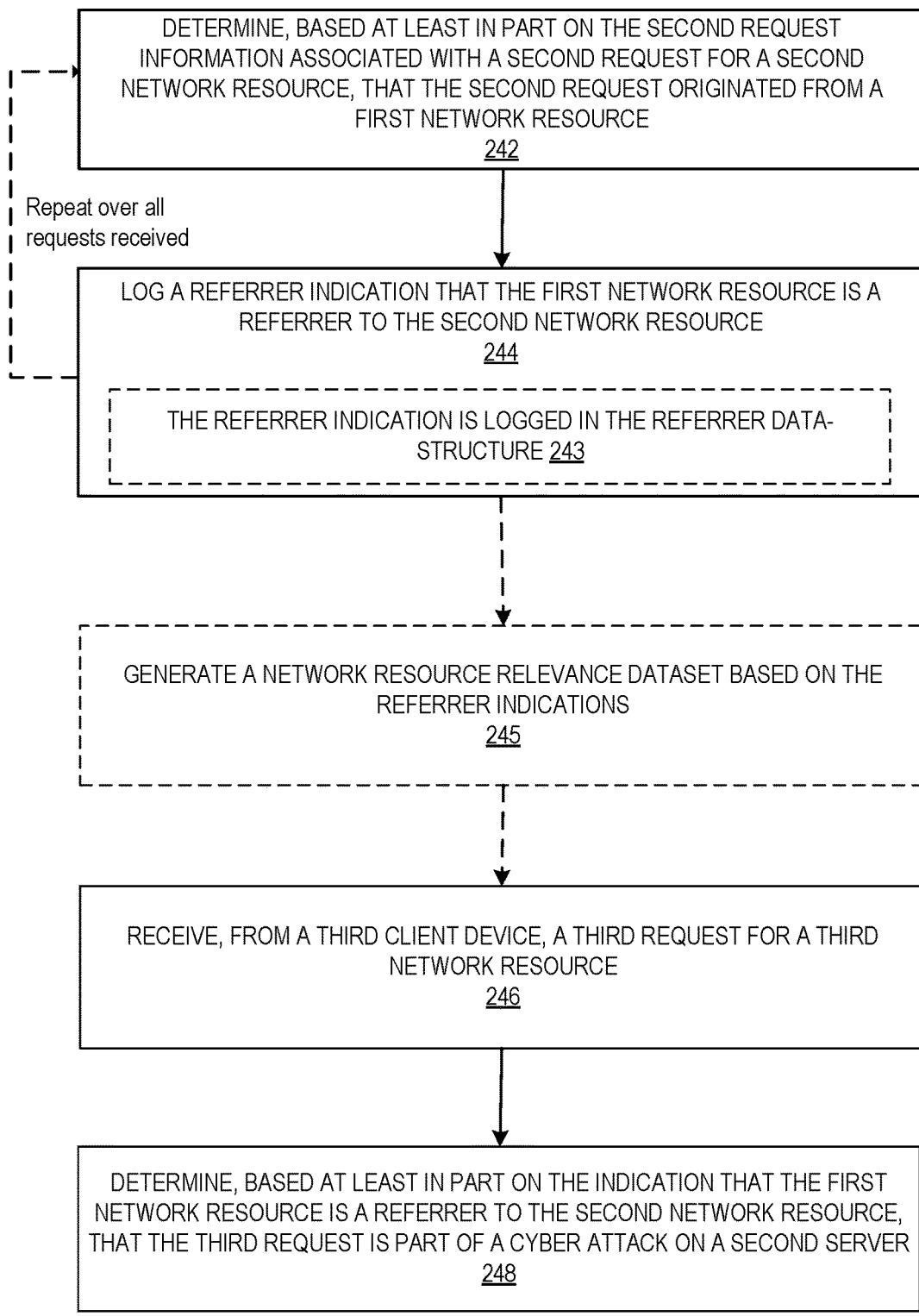
FIG. 2E illustrates a flow diagram of exemplary operations that can be performed for detecting a threat on a network resource, in accordance with some embodiments.

FIG. 2E illustrates a flow diagram of exemplary operations that can be performed for detecting a threat on a network resource, in accordance with some embodiments. The operations of FIG. 2E can be performed by a service server 125. In other embodiments, the operations of FIG. 2E can be performed by a server 120A. In some embodiments, the operations of FIG. 2E can be performed by a combination of the server 120A and the service server 125, where some of the operations (e.g., operations 246 and 248, or operation 246 only) are performed by the server 120A and other operations (e.g., operations 242 and 244, or operations 242, 244, and 248) are performed by the service server 125.

At operation 242, a determination that the second request originated from a first network resource is performed based, on at least in part, on the second request information associated with the second request for a second network resource. In some embodiments, the determination that the second request originated from the first network resource is performed as described with reference to FIG. 2G. In other embodiments, the determination that the second request originated from the first network resource is performed as described with reference to FIG. 2H.

The flow of operations moves to operation 244, at which in response to determining that the second request originated from the first network resource, a server (e.g., server 120A or service server 125) logs an indication that the first network resource is a referrer to the second network resource. For example, the referrer indication that the first network resource is a referrer to the second network resource can be logged as the referrer data structure 128 (e.g., a referrer graph) in which the first network resource is identified as an origin for the second request. While some embodiments herein describe a graph as an exemplary data structure used for logging referrer indication for the network resources, in other embodiments different types of data structures can be used (e.g., tables, lists, relational databases, etc.). In some embodiments, the referrer indication can also be associated with a cost or weight. The weight represents the confidence the system has in the determination that the first network resource is a referrer to the second network resource.

The weight associated with a referrer indication can be determined based on multiple factors. For example, the weight can depend on the number of requests received for the first network resource and the second network resource. In some embodiments, the determination of the weight to be associated with a referrer indication that the first network resource is a referrer to the second network resource, can further be performed based on past requests received from the client device 110A and/or other requests received from other client devices for the first and the second network resource. The weight is proportional to the number of requests that result in a first network resource being identified as a referrer to the second network resource. The greater the number of requests resulting in the first network resource being identified as a referrer to the second network resource, the greater the weight is. Further, the weight associated with a referrer indication (e.g., indication that the first network resource is a referrer to the second network resource) varies as new requests for a network resource are received. For example, if it was previously determined that the first network resource is a referrer to the second network resource, the weight is increased when a new determination that the first network resource is a referrer to the second network resource occurs upon receipt/transmission of a new request for the second network resource. In some embodiments, additional criteria and/or parameters can be used when determining the weight associated with a referrer indication. In some embodiments, a combination of volume of requests to the second network resource with the first network resource as the referrer with other trust metrics (e.g., metrics indicating a level of trust the system has in that the request originated from an honest device, i.e., the request is not part of any attack, bot activity) can be used to determine the weight. For example, if a request is determined to be malicious (by the server 120A or the server 125), the referrer indication resulting from the request can be used to update an existing weight for that referrer indication accordingly. The detection of the request as being a malicious request may result in the decrease of the weight associated with the referrer indication. In some embodiments, the weight associated with the referrer indication can be updated when a given number of requests resulting in that referrer indication is determined to be malicious exceeds a given threshold. In other words, in some embodiments, the weight is decreased only if a number of malicious requests that exceeds the threshold is received. If the number of malicious requests does not exceed the threshold, the weight is not decreased. For example, the weight may remain unchanged when the number of malicious requests is below the threshold.

In some embodiments, during a single user session, a user of a client device 110A may visit multiple network resources resulting in multiple requests being transmitted to the server 120A. These requests are processed, and referrer indications are generated for the network resources visited during the user session. In some embodiments, when the server 120A is a proxy server that receives requests from the client device 110A instead of the origin server(s) that host these resources, the server 120A may receive a subset of all requests that originates from the client device 110A during a same user session. For example, in a first series of requests the user may navigate through a website that is hosted on an origin server of which the owner is a customer of the cloud-based service resulting in all requests for these resources to be received at a proxy server of the cloud-based service. However, at a given time the user may click on an external link for requesting a resource that is not hosted by an origin server of which the owner is a customer of the cloud-based service. In this case, the request for this resource will not be received by the server 120A, and instead will be received by another server that is not in the network of servers of the cloud-based service. This may cause the referrer indications logged for the user session to be incomplete. In some embodiments, multiple views on the user session can be constructed and rated in terms of likelihood of being correct, by the referrer determiner 126. For example, the referrer determiner 126 may refer to information collected in previous user sessions to determine whether to set a first network resource as a referrer to another network resource and/or how to calculate the weight associated with this determination even when a request for the second network resource did not include a header with the referrer indication.

The operations 242 and 244 are repeated over multiple requests received at the proxy server 120A. In some embodiments, the server 120A may be in communication with one or more additional client devices (e.g., client device 110Q), and may log request information and/or referrer indication for each one of the requests received from these client devices. Additionally, the system 100 may include one or more additional servers, e.g., server 120A-120N, that are part of a cloud-based service and which receives requests on behalf of origin servers. These servers are operative to log request information for the requests that they receive, and which are directed to the origin servers. In some embodiments, multiple servers of the server 120A-N are operative to transmit the request information to the service server 125, which determines the referrer indications. The determination of the referrer indication, results in a referrer data-structure 128 generated for multiple network resources that are served by the servers 120A-N.

In some embodiments, the flow of operations moves to operation 245. In other embodiments, the operation 245 is skipped. At operation 245, a network resource relevance dataset is generated based on the referrer indications logged for the requests. For example, the network resource relevance dataset includes network resources with an associated relevance metric. The relevance metric is determined based on the referrer indications (e.g., the referrer data-structure 128) determined over time by the server 125 for multiple requests. The relevance metric is associated with each network resource and depends on the number of network resources that refer to the network resource. For example, the greater the number of network resources that refer to a network resource, the higher the relevance of the network resource is. Additionally, or alternatively, the relevance metric for a network resource can be determined based on the time spent by the user of the client device visiting the network resource. For example, the longer the user remains on the network resource prior to visiting another network resource, the more relevant the network resource is (e.g., the greater the relevance metric for that network resource is). The relevance metric of a network resource is an indication of actual network resources that are accessed by a user following other network resources, which gives an accurate indication of browsing activities and relevance of network resources on the web. The relevance dataset is a representation of the importance of network resources with respect to one another on the web. In some embodiments, additional criteria can contribute to determination of the relevance metric in the relevance dataset. For example, requests received at the proxy servers can be labeled (e.g., through a machine learning mechanism) as requests "originating from a human" or "originating from a bot" and the relevance metric is updated for a network resource according to the associated label. Thus, while a network resource can have an initial relevance metric indicating high relevance of the network resource as a result of a great number of network resources, referring to the network resource and/or a long time spent by users on the network resource, the relevance metric of this network resource can be reduced when one or several requests for these network resources are labeled as "originating from a bot." Further, the relevance metric can depend on the weight associated with the referrer indication(s) associated with the network resource. Thus, while in some embodiments, the number of resources that refer to a network resource can be an indication of a greater relevance of the network resource, in some embodiments, the weight associated with each referrer indication for that network resource is taken into consideration as well.

Referring back to FIG. 2E, the flow of operations moves to operation 246, at which a third request for a third network resource is received. The third request is received at the server 120A. The third request may be received from the first client device 110A or from another client device, which is different from the first client device 110A. In some embodiments, the third request is received from a malicious client device (e.g., a malicious bot). The flow of operations moves to operation 248, at which the server 120A determines, based at least in part on the referrer indication that the first network resource is a referrer to the second network resource to the second request originated from the first network resource, that the third request is part of a cyber-attack on a second server. In some embodiments, the second server is owned by a customer of the cloud-based service of which the server 120A is part. In other embodiments, the second server can be the server 120A. The cyber-attack is an attempt by a perpetrator to make a machine or network resource unavailable to its intended users by temporarily or indefinitely disrupting services of a host (e.g., services and resources offered by the origin servers 130A-L and/or the servers 120A-N). For example, the cyber-attack can be a botnet attack. The botnet attack can be one of a Distributed Denial of Service (DDoS) attack that causes unplanned application downtime, an attack to validate lists of leaked credentials (credential-stuffing attacks) leading to account takeovers, a web application attack to steal data, or an attack to provide an attacker access to a device and its connection to a network, etc.

In some embodiments, the determination that the third request is part of a cyber-attack may include a determination that there is an increase in the volume of requests for a given network resource over a period of time. For example, the requests received at one or more servers 120A-N are grouped based on the referrer indications determined for these requests. For example, the third request can be a request for the second network resource (Resource B) and is preceded by a request for the first network resource (Resource A) resulting in the referrer indication for the third request to identify the first network resource as a referrer (or origin of) to the second network resource. The referrer indication for the third request can be used alone or in combination with other criteria to group multiple requests received at the proxy server 120A (or at multiple ones of the servers 120A-N) over a period of time. In some embodiments, the volume of the grouped requests is compared with a threshold value. When the volume of the grouped requests is greater than the threshold value it is an indication that the third request for the network resource is part of an attack on the network resource. Alternatively or additionally, the referrer indication data can be represented in an efficient data-structure such as a Markov chain, and can be used to interpret the intention of the user from which the request is received (e.g., as identified by the user-agent information). In some embodiments, a chain is determined for the network resources requested during a session of the user. The chain is built based upon the referrer information determined for each resource requested during that session. This chain can be referred to as a session chain and represents the network resources requested by the user during the user session linked based on the referrer information. In some embodiments, the session chain can be generated with the exact locations of the network resources identified in the referrer indication. Alternatively, or additionally, the session chain can be generated based on generalized locations of the network resources (e.g., a truncated address of the network resource is used instead of the actual address of the network resource). In some embodiments, the session chain for that user is compared to chains in the referrer data-structure 128 to determine whether the user session is a malicious session or not. For example, a malicious user will have a different path through a website from normal clicking users resulting in a session chain for a given request to be different from a chain generated for a normal user when requesting the same network resource. The data-structure 128, which is generated based on non-malicious and potentially malicious traffic, is used to characterize a new user session and the new chain for that session as malicious or not. Upon determining that the session and/or the client device is malicious based on the referrer chain, the client device and/or the session are flagged as such. In some embodiments, fuzzy matching logic (e.g., supervised or unsupervised machine-learning mechanism, outlier detection mechanisms) can be used to determine that the third request is part of a cyber-attack. For example, the session chain for the third request can be input to a fuzzy matching module, which labels the third request as malicious or not.

In some embodiments, the attack on the network resource is flagged and the server (e.g., the service server 125 or the server 120A) may determine to block and/or monitor any requests with similar characteristics (e.g., originating from the same client device, for the same network resource, for the same user session, etc.). In some embodiments, the server 125 determines, based on the referrer indication for the third request, that the request is likely to be part of a cyber-attack and forwards the information to the server 120A. The server 120A then modifies its response to the receipt of similar requests (e.g., requests from the client device 110A, requests for the second network resource from the client device 110A or from other client devices, requests for the first network resource, etc.). In some embodiments, the server 120A is configured to block all requests associated with the flagged request. In other embodiments, the server 120A is configured to monitor all requests associated with the flagged request. In some embodiments, when the cyber-attack is identified at the server 125, the service server 125 may transmit the information that there is an attack to one or more of the servers 120A-N. The information identifies the type of attack (e.g., DDoS attack, malicious bot, etc.). Each one of these servers may be operative to modify their response according to the attack by blogging and/or monitoring requests associated with the request that caused the detection of the attack based on the referrer indication. The requests associated with the request that caused the detection of the attack can be requests from the same client device, requests for the same network resource from the same client device, or from other client devices, requests for the referrer network resource, etc.

Embodiments described herein improve mechanisms of security threat detection on network resources using referrer information gathered over time for multiple network resources. The embodiments allow the efficient detection of these threats based on the behavior of actual network traffic and a new type of information related to the network traffic, namely the referrer information. The referrer information for the network resources includes the determination of the referrer indications for the requests and the generation of the referrer data-structure based on these referrer indications.

Improving the Ranking of Search Results

Figure 2F:
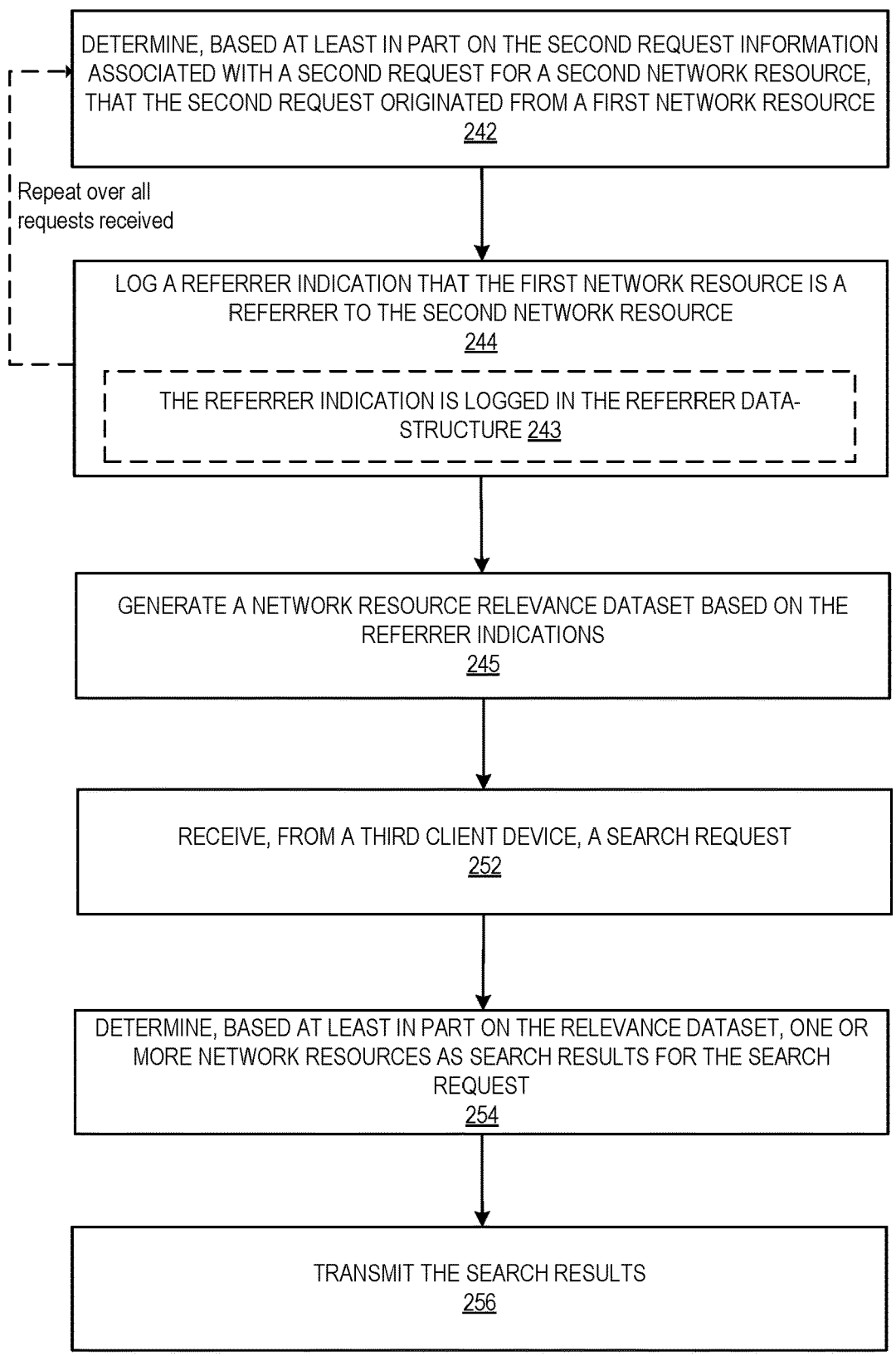
FIG. 2F illustrates a flow diagram of exemplary operations that can be performed for responding to a search request based on the referrer indications, in accordance with some embodiments.

In addition to or alternatively to detecting cyber-attacks, the referrer indications determined for requests can be used for responding to search requests. FIG. 2F illustrates a flow diagram of exemplary operations that can be performed for responding to a search request based on the referrer indications, in accordance with some embodiments. Similarly, to FIG. 2E, operations 242-245 are performed. The flow of operations moves to operation 252, at which the server 120A receives from a third client device a search request. The search request includes one or more query parameter values (e.g., keywords (e.g., alphanumerical terms), conjunctions terms, etc.) that a user of the client device 110A submitted. In a non-limiting example, the search request is an HTTP SEARCH request. In another non-limiting example, the search request is an HTTP GET request.

The flow moves from operation 252 to operation 254. At operation 254, the server 120A determines, based at least in part on the relevance dataset, one or more network resources as search results for the search request. The determination of the network resources as search results includes a query of a search index to obtain a set of network resources and a ranking of these network resources to be presented in a given order. The order being indicative of the relevance of the page with respect to the search request.

Upon receipt of the search request, a query is performed on a search index. A search index is a data structure that includes structured information related to unstructured network resource data. The search index is generated for a set of network resources in the interest of expediting searches on these network resources. Thus, using a search index enables the reduction of the time to respond to a search request as the search query is performed on the search index instead of the body of each one of the network resources.

In some embodiments, the search index is generated by crawling the web. Crawling the web includes scanning known network resources, and following hyperlinks from these network resources to other network resources. In these embodiments, crawling of the web can be performed whether or not the server 120 is part of a cloud-based service. When the server 120 is part of the cloud-based service, the scanning of a network resource can be performed regardless of whether or not the network resource is served by the cloud-based service (i.e., the owner of the network resource has registered the network resource for the cloud-based service). Thus, in these embodiments, network resources served by the cloud-based service, as well as resources that are not served by the cloud-based service, are scanned to generate the search index. In other embodiments, the search index is generated by a combination of crawling the web and the scanning of network resources that pass through the server 120A as a result of requests for these resources from client devices.

The query of the search index outputs a search result that includes two or more network resources. The server 120A ranks the network resources in terms of relevance with respect to the search request in order to be presented in a given order to the user who made the request. The ranking of the network resources is performed based on the relevance dataset. The relevance dataset can be used alone or in combination with one or more search ranking techniques to rank the network resources. In one example, if the search results include resource A, B, and C the relevance dataset 129 may include a first relevance metric for resource A, a second relevance metric for resource B, and a third relevance metric for resource C. The second relevance metric for resource B, when compared with the first relevance metric and the third relevance metric, indicates that resource B is more relevant as a search result than both C and A. The second relevance metric for resource B may indicate that resource B is more relevant as a search result than both C and A, as a result of resource A and resource C both referring to resource B. In another embodiment, the relevance metric of each network resource included in the search result can be used in combination with other network resource-ranking mechanisms to order the network resources of the search result in terms of relevance. In some embodiments, a link analysis mechanism, which assigns a weight to each element of a hyperlinked set of documents, with the purpose of measuring a relative importance of the documents with respect to one another can be used in combination with the relevance metrics to order the network resources of the search result. In some embodiments, additionally or alternatively to the link analysis mechanism, other mechanisms can be used in combination with the relevance metrics.

The flow of operations moves to operation 256, at which the search results are transmitted to the requesting client device. The search results are presented in an order defined at least in part by the relevance metrics of the network resources.

Referring to FIG. 2E and FIG. 2F, several embodiments can be used to determine, based at least in part on the second request, information associated with a second request for a second network resource, that the second request originated from a first network resource. FIG. 2G illustrates a flow diagram of exemplary operations that can be performed for determining that the second request originated from the first network resource, in accordance with some embodiments. In some embodiments, the determination that the second request 105 originated from the first network resource 101 includes determining, operation 262, that the second request includes a header including a referrer indication that the second request originated from the first network resource. The referrer indication identifies the location of the network resource (e.g. a Uniform Resource Identifier (URI) or an Internationalized Resource Identifier (IRI)) which is linked to the resource being requested. The referrer indication is the location of the previous network resource (here the first network resource) from which a link to the currently requested network resource (here the second network resource) was followed. The referrer determiner 126 checks the value of the header in the second request to identify the first network resource. In some non-limiting examples, the header can be an HTTP referer header (operation 264).

In another embodiment, the referrer determiner 126 determines that the second network resource originated from the first network resource based on one or more of the parameters included in the first request information 150A and the second request information 150B. FIG. 2H illustrates a flow diagram of exemplary operations that can be performed for determining that the second request originated from the first network resource, in accordance with some embodiments. The determination that the second network resource originated from the first network resource can be performed as described with reference to FIG. 2H, when it is determined that the second request does not include the referrer indication (e.g., when the second request does not include a header including the referrer indication). The determination that the second request 105 originated from the first network resource 101 is performed based on one or more of the first IP address 156A and the second IP address 156B, the first information 153A and the second information 153B, the first user session identifier 154A and the second user session identifier 154B, and/or the first time-indicator 155A and the second time-indicator 155B.

At operation 272, the referrer determiner 126 determines whether the first request 101 and the second request are associated with the same IP address (i.e., whether the first IP address 156A and the second IP address 156B are the same). Further, the referrer determiner 126 determines, at operation 274, whether the first request 101 and the second request are received within a threshold interval of time based on the first time-indicator 155A and the second time-indicator 155B. When the first request 101 and the second request are determined to be received within a threshold interval of time based on the first time-indicator 155A and the second time-indicator 155B, this be an indication that the user of the client device 110A has visited the second network resource following the first network resource. In some embodiments, upon determining that the first request and the second request are associated with the same IP address and that these requests are received within the threshold time interval, the referrer determiner 126 may determine that the first network resource is a referrer to the second network resource (in other words, that the second network resource has originated from the first network resource).

In other embodiments, the determination that the first request and the second request are associated with the same IP address, and that these requests are received within the threshold time interval is not sufficient to determine that the second network resource has originated from the first network resource. For example, several client devices may share the same IP address and may transmit requests to the server 120A within the threshold time interval. Thus, the referrer determiner 126 may determine that the second network resource has originated from the first network resource based on a combination of other criteria. For example, in addition to determining that the first request and the second request are associated with the same IP address, that the time-indicators are within the threshold time interval, the referrer determiner 126 may further determine, at operation 276, whether the first information 152A and the second information 153B are similar, indicating that the first request 101 and the second request 105 were received from the same web client application. Additionally, or alternatively, the referrer determiner 126 may determine, at operation 278, whether the first session identifier 154A is the same as the second session identifier 154B. In some embodiments, the determination that the second request originated from the first network resource is performed by performing operations 272, 274, 276, and 278 and determining that the first request and the second request are associated with the same IP address, that the time-indicators are within the threshold time interval, that the first information 152A and the second information 153B are similar, and that the first session identifier 154A is the same as the second session identifier 154B. In other embodiments, the determination that the second request originated from the first network resource is performed by performing a subset of the operations 272, 274, 276, and 278 that is less than all of the operations.

Embodiments described herein present methods and systems for determining referrer indication for requests of network resources. The referrer indication presents an indication that a network resource originated from another network resource. In other words, the referrer indication for a first and a second network resource represents information on the second network resource being visited by a user following the first network resource and provides a measure of actual clicks and/or transitions between these two network resources. The referrer indication contrasts with a link or tag information in a network resource that may associate the first network resource to the second network resource when the first network resource includes a link to the second network resource regardless of whether the second network resource is visited by the user after a visit to the first network resource. While a first network resource may include a link to another network resource this is not an indication that this other network resource will be visited by a user following a visit to the first network resource. In contrast, the referrer indication provides a measure of actual clicks and/or transitions between two network resources. Thus, the referrer indication links or associates two network resources based on actual network traffic and network resources requested. The referrer indications can be used for determining a referrer data-structure and/or a network resource relevance dataset. In some embodiments, the referrer data-structure can be used to detect security threats and attacks on the network resources. The referrer data-structure allows the detection of a malicious bot and/or a DDOS attack. In other embodiments, the referrer data-structure can be used to improve the ranking of search results where a relevance metric is determined for a network resource when the network resource is part of a search result.

Exemplary Electronic Devices

Electronic Device and Machine-Readable Media

One or more parts of the above embodiments may include software and/or a combination of software and hardware. An electronic device (also referred to as a computing device, computer, etc.) includes hardware and software, such as a set of one or more processors coupled to one or more machine-readable storage media (e.g., magnetic disks, optical disks, read only memory (ROM), Flash memory, phase change memory, solid state drives (SSDs)) to store code (which is composed of software instructions and which is sometimes referred to as computer program code or a computer program) for execution on the set of processors and/or to store data. For instance, an electronic device may include non-volatile memory (with slower read/write times, e.g., magnetic disks, optical disks, read only memory (ROM), Flash memory, phase change memory, SSDs) and volatile memory (e.g., dynamic random access memory (DRAM), static random access memory (SRAM)), where the non-volatile memory persists code/data even when the electronic device is turned off or when power is otherwise removed, and the electronic device copies that part of the code that is to be executed by the set of processors of that electronic device from the non-volatile memory into the volatile memory of that electronic device during operation, because volatile memory typically has faster read/write times. As another example, an electronic device may include a non-volatile memory (e.g., phase change memory) that persists code/data when the electronic device is turned off, and that has sufficiently fast read/write times such that, rather than copying the part of the code/data to be executed into volatile memory, the code/data may be provided directly to the set of processors (e.g., loaded into a cache of the set of processors); in other words, this non-volatile memory operates as both long-term storage and main memory, and thus the electronic device may have no or only a small amount of volatile memory for main memory. In addition to storing code and/or data on machine-readable storage media, typical electronic devices can transmit code and/or data over one or more machine-readable transmission media (also called a carrier) (e.g., electrical, optical, radio, acoustical or other form of propagated signals—such as carrier waves, infrared signals). For instance, typical electronic devices also include a set of one or more physical network interface(s) to establish network connections (to transmit and/or receive code and/or data using propagating signals) with other electronic devices. Thus, an electronic device may store and transmit (internally and/or with other electronic devices over a network) code and/or data with one or more machine-readable media (also referred to as computer-readable media).

Electronic devices are used for a variety of purposes. For example, an electronic device (sometimes referred to as a server electronic device) may execute code that cause it to operate as one or more servers used to provide a service to another electronic device(s) (sometimes referred to as a client electronic device, a client computing device, or a client device) that executes client software (sometimes referred to as client code or an end user client) to communicate with the service. The server and client electronic devices may be operated by users respectively in the roles of administrator (also known as an administrative user) and end user.

Data Processing System

Figure 3:
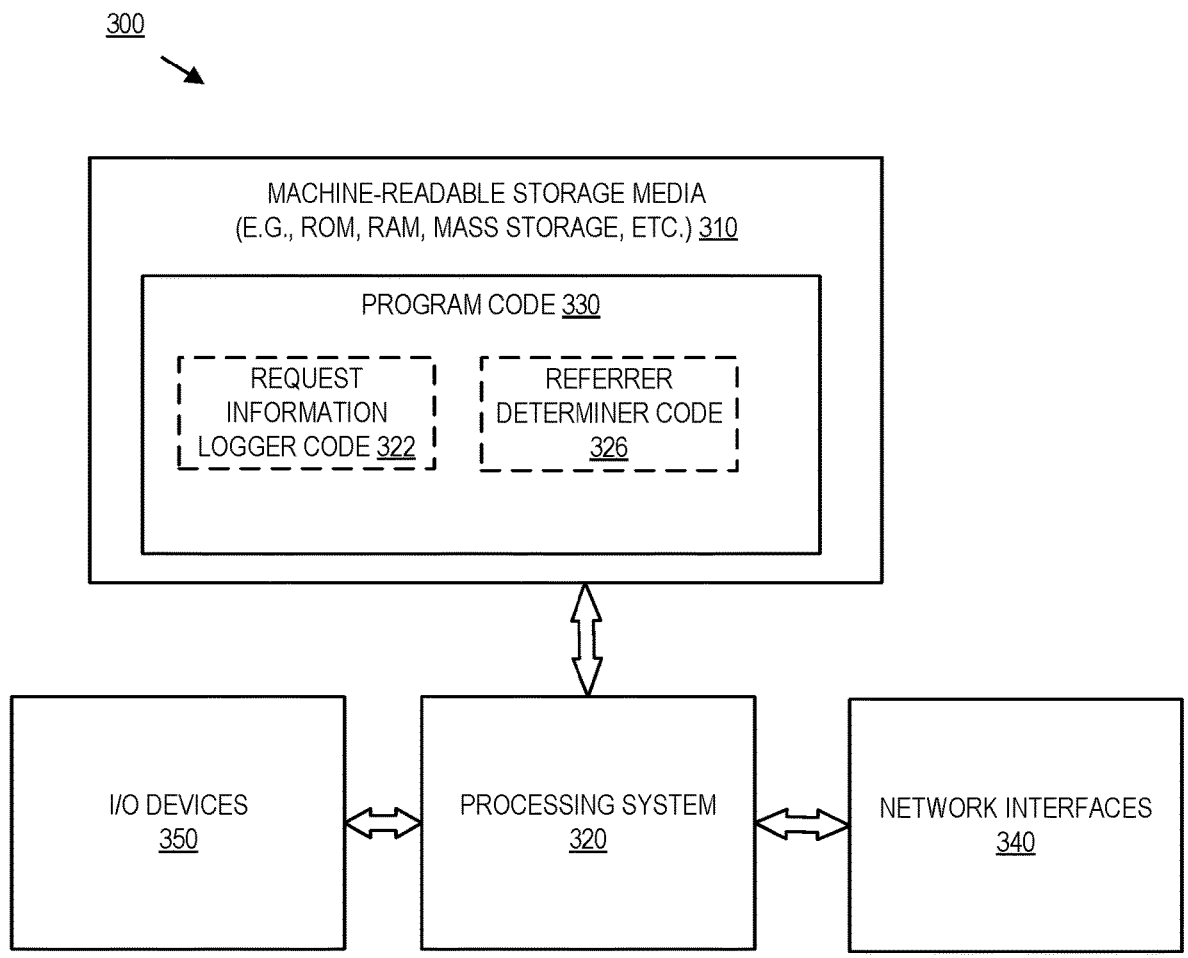
FIG. 3 illustrates a block diagram for an exemplary data processing system that may be used in some embodiments.

FIG. 3 illustrates a block diagram for an exemplary data processing system 300 that may be used in some embodiments. One or more such data processing systems 300 may be utilized to implement the embodiments and operations described with respect to the service server 125, the servers 120A-N, the origin servers 130A-R, and/or the client devices 110A-M.

The data processing system 300 is an electronic device that stores and transmits (internally and/or with other electronic devices over a network) code (which is composed of software instructions and which is sometimes referred to as computer program code or a computer program) and/or data using machine-readable media (also called computer-readable media), such as machine-readable storage media 310 (e.g., magnetic disks, optical disks, read only memory (ROM), flash memory devices, phase change memory) and machine-readable transmission media (also called a carrier) (e.g., electrical, optical, radio, acoustical or other form of propagated signals—such as carrier waves, infrared signals), which is coupled to the processing system 320. The processing system 320 may be one or more processors and/or connected system components such as multiple connected chips. The depicted machine-readable storage media 310 may store program code 330 that, when executed by the processing system 320, causes the data processing system 300 to perform the operations described herein with reference to the block diagrams and the flow diagrams of FIGS. 1A-2H. For example, the program code 330 may include the referrer determiner code 326, which when executed by the processing system 320, causes the data processing system 300 to perform the operations described with reference to the referrer determiner 126. In another example, the program code 330 may include the request information logger code 326, which when executed by the processing system 320, causes the data processing system 300 to perform the operations described with reference to the request information logger 122A. The program code 330 may include the referrer determiner code 326, the request information logger code 322, or a combination of the referrer determiner code 326 and the request information logger code 322.

The data processing system 300 also includes one or more network interfaces 340 (e.g., a wired and/or wireless interfaces) that allows the data processing system 300 to transmit data and receive data from other computing devices, typically across one or more networks (e.g., Local Area Networks (LANs), the Internet, etc.). The data processing system 300 may also include one or more input or output ("I/O") components 350 such as a mouse, keypad, keyboard, a touch panel or a multi-touch input panel, camera, frame grabber, optical scanner, an audio input/output subsystem (which may include a microphone and/or a speaker), other known I/O devices or a combination of such I/O devices. Additional components, not shown, may also be part of the system 300, and, in certain embodiments, fewer components than that shown may be part of the system 300.

While the flow diagrams in the figures show a particular order of operations performed by certain embodiments, it should be understood that such order is exemplary (e.g., alternative embodiments may perform the operations in a different order, combine certain operations, overlap certain operations, etc.).

While the above description includes several exemplary embodiments, those skilled in the art will recognize that the invention is not limited to the embodiments described and can be practiced with modification and alteration within the spirit and scope of the appended claims. The description is thus illustrative instead of limiting.

What is claimed is:

1. A method in a first server, the method comprising:
  determining, based on second request information associated with a second request for a second network resource, that the second request originated from a first network resource;
  responsive to determining that the second request originated from the first network resource, logging a referrer indication that the first network resource is a referrer to the second network resource;
  receiving a third request for a third network resource; and
  determining, based at least in part on the referrer indication, that the third request is part of a cyber-attack on a second server.

2. The method of claim 1, wherein the determining that the second request originated from the first network resource includes:
  determining that the second request includes a header including the referrer indication that the second request originated from the first network resource.

3. The method of claim 2, wherein the header is a Hypertext Transfer Protocol (HTTP) referer header.

4. The method of claim 1 further comprising:
  determining first request information associated with a first request for the first network resource; and
  determining second request information associated with the second request for the second network resource.

5. The method of claim 4, wherein the determining the first request information associated with the first request for the first network resource includes:
  determining a first identification of the first network resource;
  determining first information that identifies a first client network application that transmitted the first request;

determining a first time-indicator that indicates a time at which the first request is received; and determining a first Internet Protocol (IP) address of the first request.

6. The method of claim 5, wherein the determining the second request information associated with the second request for the second network resource includes:
   determining a second identification of the second network resource;
   determining second information that identifies a second client network application that transmitted the second request;
   determining a second time-indicator that indicates a time at which the second request is received; and
   determining a second IP address of the second request.

7. The method of claim 6, wherein the determining that the second request originated from the first network resource is performed based on one or more of the first IP address and the second IP address, the first information and the second information, and the first time-indicator and the second time-indicator.

8. The method of claim 1, wherein the cyber-attack on the second server is a distributed denial-of-service (DDoS) attack on the second server.

9. A non-transitory machine-readable storage medium that provides instructions that, when executed by a processor of a first server, causes said processor to perform operations comprising:
   determining, based on second request information associated with a second request for a second network resource, that the second request originated from a first network resource;
   responsive to determining that the second request originated from the first network resource, logging a referrer indication that the first network resource is a referrer to the second network resource;
   receiving a third request for a third network resource; and
   determining, based at least in part on the referrer indication, that the third request is part of a cyber-attack on a second server.

10. The non-transitory machine-readable storage medium of claim 9, wherein the determining that the second request originated from the first network resource includes:
    determining that the second request includes a header including the referrer indication.

11. The non-transitory machine-readable storage medium of claim 10, wherein the header is a Hypertext Transfer Protocol (HTTP) referer header.

12. The non-transitory machine-readable storage medium of claim 9, wherein the operations further comprise:
    determining first request information associated with a first request for the first network resource; and
    determining second request information associated with the second request for the second network resource.

13. The non-transitory machine-readable storage medium of claim 12, wherein the determining the first request information associated with the first request for the first network resource includes:
    determining a first identification of the first network resource;
    determining first information that identifies a first client network application that transmitted the first request;
    determining a first time-indicator that indicates a time at which the first request is received; and
    determining a first Internet Protocol (IP) address of the first request.

14. The non-transitory machine-readable storage medium of claim 13, wherein the determining the second request information associated with the second request for the second network resource includes:
    determining a second identification of the second network resource;
    determining second information that identifies a second client network application that transmitted the second request;
    determining a second time-indicator that indicates a time at which the second request is received; and
    determining a second IP address of the second request.

15. The non-transitory machine-readable storage medium of claim 14, wherein the determining that the second request originated from the first network resource is performed based on one or more of the first IP address and the second IP address, the first information and the second information, and the first time-indicator and the second time-indicator.

16. The non-transitory machine-readable storage medium of claim 9, wherein the cyber-attack on the second server is a distributed denial-of-service (DDoS) attack on the second server.

17. A first server comprising:
    a non-transitory machine-readable storage medium that provides instructions that, if executed by a processor, will cause the first server to perform operations comprising:
    determining, based on second request information associated with a second request for a second network resource, that the second request originated from a first network resource,
    responsive to determining that the second request originated from the first network resource, logging a referrer indication that the first network resource is a referrer to the second network resource,
    receiving a third request for a third network resource, and
    determining, based at least in part on the referrer indication, that the third request is part of a cyber-attack on a second server.

18. The first server of claim 17, wherein the determining that the second request originated from the first network resource includes:
    determining that the second request includes a header including the referrer indication.

19. The first server of claim 18, wherein the header is a Hypertext Transfer Protocol (HTTP) referer header.

20. The first server of claim 17, wherein the operations further comprise:
    determining first request information associated with a first request for the first network resource; and
    determining second request information associated with the second request for the second network resource.

21. The first server of claim 20, wherein the determining the first request information associated with the first request for the first network resource includes:
    determining a first identification of the first network resource;
    determining first information that identifies a first client network application that transmitted the first request;
    determining a first time-indicator that indicates a time at which the first request is received; and
    determining a first Internet Protocol (IP) address of the first request.

22. The first server of claim 21, wherein the determining the second request information associated with the second request for the second network resource includes:

determining a second identification of the second network resource;

determining second information that identifies a second client network application that transmitted the second request;

determining a second time-indicator that indicates a time at which the second request is received; and determining a second IP address of the second request.

23. The first server of claim 22, wherein the determining that the second request originated from the first network resource is performed based on one or more of the first IP address and the second IP address, the first information and the second information, and the first time-indicator and the second time-indicator.

24. The first server of claim 17, wherein the cyber-attack on the second server is a distributed denial-of-service (DDoS) attack on the second server.

* * * * *